(12) United States Patent
Schrey et al.

(10) Patent No.: US 8,085,327 B2
(45) Date of Patent: Dec. 27, 2011

(54) IMAGE SENSOR, METHOD FOR OPERATING AN IMAGE SENSOR, AND COMPUTER PROGRAM USING A TIME-DELAYED INTEGRATION

(75) Inventors: Olaf Schrey, Ratingen (DE); Bedrich Hosticka, Muehlheim (DE); Werner Brockherde, Duisburg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 508 days.

(21) Appl. No.: 12/166,651

(22) Filed: Jul. 2, 2008

(65) Prior Publication Data
US 2009/0009645 A1 Jan. 8, 2009

(30) Foreign Application Priority Data
Jul. 4, 2007 (DE) .......................... 10 2007 030 985

(51) Int. Cl.
*H04N 3/14* (2006.01)
*H04N 5/335* (2011.01)
(52) U.S. Cl. ....................................... 348/308; 348/294
(58) Field of Classification Search .................. 348/308; 378/38–40; 356/237, 625, 614
See application file for complete search history.

(56) References Cited

U.S. PATENT DOCUMENTS

| | | | |
|---|---|---|---|
| 6,320,617 B1 * | 11/2001 | Gee et al. | 348/302 |
| 6,635,857 B1 * | 10/2003 | Kindt | 250/208.1 |
| 6,678,048 B1 | 1/2004 | Rienstra et al. | |
| 6,747,264 B2 * | 6/2004 | Miida | 250/214 AG |
| 6,757,627 B2 * | 6/2004 | Mizuno | 702/65 |
| 6,850,278 B1 * | 2/2005 | Sakurai et al. | 348/302 |
| 6,906,749 B1 | 6/2005 | Fox | |
| 7,154,075 B2 * | 12/2006 | Krymski | 250/208.1 |
| 7,189,953 B2 * | 3/2007 | Machida | 250/208.1 |
| 2004/0239788 A1 * | 12/2004 | Sugiyama et al. | 348/302 |
| 2006/0138482 A1 * | 6/2006 | Han | 257/291 |
| 2007/0273772 A1 * | 11/2007 | Shirai | 348/223.1 |

FOREIGN PATENT DOCUMENTS
WO WO 03/008940 1/2003
* cited by examiner

*Primary Examiner* — Jason Chan
*Assistant Examiner* — Cynthia Calderon
(74) *Attorney, Agent, or Firm* — Michael A. Glenn; Glenn Patent Group

(57) ABSTRACT

An image sensor includes a plurality of image elements configured to provide associated image element signals which are dependent on light intensities incident on the image elements. The image sensor includes an accumulation circuit with a plurality of charge storage elements, wherein the accumulation circuit is configured to change charges on the charge storage elements during a phase in dependence on image element signals of respectively associated image elements. The accumulation circuit is further configured to change an association between charge storage elements and associated image elements in successive phases, so that in operation, a charge on one of the charge storage elements depends on image element signals of plural image elements in a plurality of phases.

28 Claims, 9 Drawing Sheets

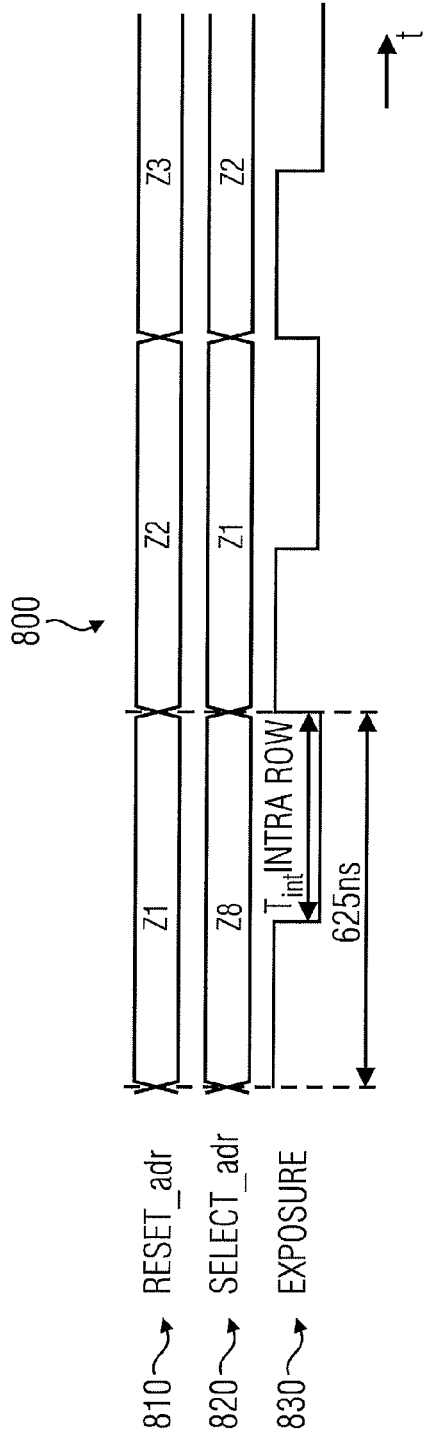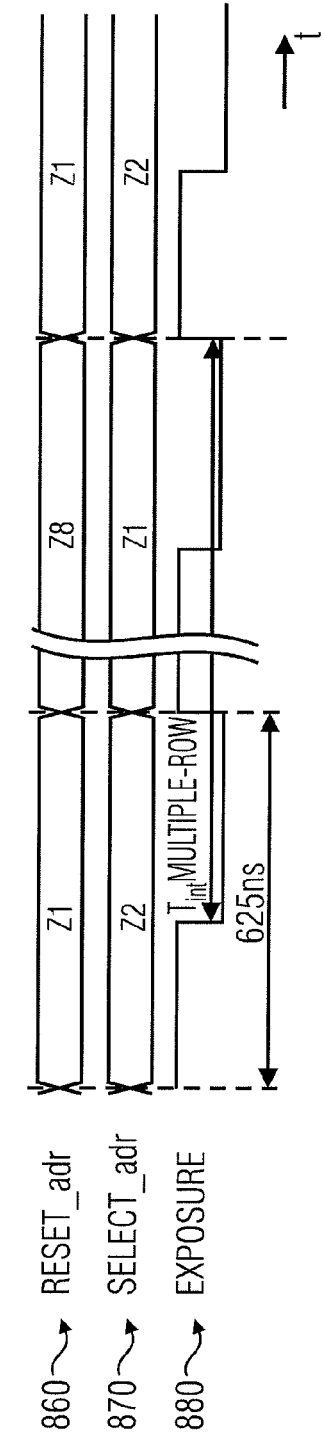
FIGURE 8A
FIGURE 8B

IMAGE SENSOR, METHOD FOR OPERATING AN IMAGE SENSOR, AND COMPUTER PROGRAM USING A TIME-DELAYED INTEGRATION

CROSS-REFERENCE TO RELATED APPLICATIONS

This application claims priority from German Patent Application No. 102007030985.8, which was filed on Jul. 4, 2007, and is incorporated herein in its entirety by reference.

TECHNICAL FIELD

Embodiments of the present invention relate to an image sensor, a method for operating an image sensor, and a computer program. A further embodiment of the present invention relates to a method for time-delayed integration with CMOS circuits with switched capacitors (switched-capacitor CMOS circuits).

BACKGROUND

In some applications, it is advantageous, or necessitated, to capture images in a motion-synchronized manner. For example, in so-called TDI methods, that is, methods for a time-delayed integration, an object is shifted with respect to an image sensor. If the mapping of an object moves with respect to the image sensor, it is often desirable to capture the moving object almost free of distortion.

CMOS image sensors for the capture of images are already known from the art, scientific literature and different patent documents.

In contrast, methods for time-delayed integration (i.e. TDI methods) up to date have been realized almost exclusively with CCD sensors (i.e. sensors with a charge-coupled means). They have some inherent disadvantages. For example, by the bucket-brigade method, charges are lost with every shift clock, which is also called smearing. For example, with a high object speed, or a large mapping scale, an object quickly sweeps over several rows, perhaps all rows of a sensor matrix. Accordingly, with an accumulation across many rows, many shift operations are to be performed. Thus, an important part of the photo charges is lost by smearing, whereby an advantage by accumulation is strongly leveled. For this reason, there are only very few manufacturers offering TDI CCD sensors, such as Fairchild and Hamamatsu. These manufacturers have special processes at their disposal, by which the smear rate is reduced with a high effort in the technical process. Accordingly, the sensors are high-priced. Currently, multi-row or area sensors with several thousand pixels cost approximately between $2.000 and $5.000 a piece.

For this reason, in some cases, high-speed CMOS/CCD sensors with an accumulation are alternatively employed in camera systems. This concept also shows significant disadvantages. For example, due to a fast readout, only a very short exposure time is available. Likewise, single-shot signals are noised due to the high readout bandwidth.

SUMMARY

According to an embodiment, an image sensor may have: a plurality of image elements configured to provide associated image element signals which are dependent on light intensities incident on the image elements; an accumulation circuit having a plurality of charge storage elements, wherein the accumulation circuit is configured to change charges on the charge storage elements during a phase in dependence on the image element signals of respectively associated image elements and to change an association between charge storage elements and associated image elements in successive phases, so that in operation, a charge on one of the charge storage elements depends on image element signals of plural image elements in a plurality of phases.

According to another embodiment, a method for operating an image sensor with a plurality of image elements configured to provide associated image element signals which are dependent on light intensities incident on the image elements, and a plurality of charge storage elements, may have the steps of: a) Changing of charges on the charge storage elements in dependence on image element signals of respectively associated image elements, wherein an association between charge storage elements and respectively associated image elements is established by a first association rule; b) Acquiring a changed association rule changed with respect to the first association rule and describing an association between charge storage elements and respectively associated image elements for a following charge-changing step; and c) Repeating steps a) and b).

Another embodiment may have a computer program for performing the method for operating an image sensor with a plurality of image elements configured to provide associated image element signals which are dependent on light intensities incident on the image elements, and a plurality of charge storage elements, the method including: a) Changing of charges on the charge storage elements in dependence on image element signals of respectively associated image elements, wherein an association between charge storage elements and respectively associated image elements is established by a first association rule; b) Acquiring a changed association rule changed with respect to the first association rule and describing an association between charge storage elements and respectively associated image elements for a following charge-changing step; and c) Repeating steps a) and b), when the computer program runs on a computer.

According to another embodiment, an image sensor may have: a plurality of image elements configured to provide associated image element signals which are dependent on light intensities incident on the image elements; an accumulation circuit having a plurality of charge storage elements, wherein the accumulation circuit is configured to change charges on the charge storage elements during a phase in dependence on the image element signals of respectively associated image elements and to change an association between charge storage elements and associated image elements in successive phases, so that in operation, a charge on one of the charge storage elements depends on image element signals of plural image elements in a plurality of phases; wherein the image elements are coupled to a column line via switches; wherein the accumulation circuit is configured to receive, in a phase, image element signals one after the other from a plurality of image elements via the column line, and to change charges of the charge storage elements one after the other in dependence on the current association between charge storage elements and associated image elements, in dependence on the image element signals of the respectively associated image elements; wherein the accumulation circuit has an operational amplifier; wherein an input of the operational amplifier is coupled to the column line; and wherein a feedback branch of the operational amplifier has a plurality of switched accumulation capacities switchable into the feedback branch via switches and forming the charge storage elements.

According to another embodiment of the present invention, an image sensor may have: a plurality of image elements configured to provide associated image element signals which are dependent on light intensities incident on the image elements; an accumulation circuit with a plurality of charge storage elements, wherein the accumulation circuit is configured to change charges on the charge storage elements during a phase in dependence on the image element signals of respectively associated image elements and to change an association between charge storage elements and associated image elements in successive phases, so that in operation, a charge on one of the charge storage elements depends on image element signals of plural image elements in a plurality of phases; wherein the image elements are coupled to a column line via switches, wherein the accumulation circuit has an operational amplifier; wherein an input of the operational amplifier is electrically effectively coupled to the column line via a voltage/charge converter; wherein the voltage/charge converter is configured to convert a change of a potential present on the column line into a charge quantity; wherein the accumulation circuit is configured to change, in a phase, the charge of a considered charge storage element switched into a feedback path of the operational amplifier, in dependence on a voltage difference between a first state of an image element signal of an image element currently associated with the charge storage element considered, and a second state of the image element signal of the image element currently associated with the charge storage element considered, wherein the first state of the image element signal or the second state of the image element signal is a reset state.

Some embodiments of the present invention are based on the knowledge that an image moved with respect to the image sensor may captured with a particularly good quality if a charge on a charge storage element is formed depending on image element signals of plural image elements in a plurality of phases, and further if an association between charge storage elements and image elements is changed in the course of the object's motion or adapted to the object's motion. For example, the arrangement mentioned allows an image point moving with respect to the image sensor to respectively contribute to a charge of the same charge storage means in different image-capture phases. Thus, by changing charges of a charge storage element across several phases, an effective exposure time longer than a single phase results, for example. By changing the association between charge storage elements and respectively associated image elements, it may be achieved that an image point of a moving object substantially contributes to a charge of a single charge storage element within a particular period of time. Thus, using the image sensor, some embodiments allow obtaining a sharp mapping also of pictures moved with respect to the image sensor.

For example, the above-described image sensor further allows a realization in a CMOS technology since the charge storage in the charge storage element as well as the changeable association between charge storage elements and image elements may be efficiently realized in a CMOS technology with switched capacitors, for example. Using the above-described concept, in some embodiments, a loss of quality by smearing of charges may further be avoided since in some embodiments, there is no need to pass on a charge as completely as possible.

The above-described concept further allows a particularly cost-effective realization since both the realization of charge storage elements and the realization of a changeable association between charge storage elements and image elements may be implemented in a conventional technology at a low cost.

Further, by the realization of a changeable association between charge storage elements and associated image elements, a bucket-brigade principle may be replaced, as is employed in CCD TDI sensors, for example. Thus, in some embodiments, the need for expensive large-scale process steps necessitated for manufacturing a CCD image sensor is omitted.

In some embodiments, an operational speed may be substantially increased by avoiding the bucket-brigade principle.

BRIEF DESCRIPTION OF THE DRAWINGS

Embodiments of the present invention will be detailed subsequently referring to the appended drawings, in which:

FIG. 8a is a graphic illustration of signal waveforms for an intra-row exposure;

FIG. 8b is a graphic illustration of signal waveforms for a multiple-row exposure.

DETAILED DESCRIPTION

Figure 1:
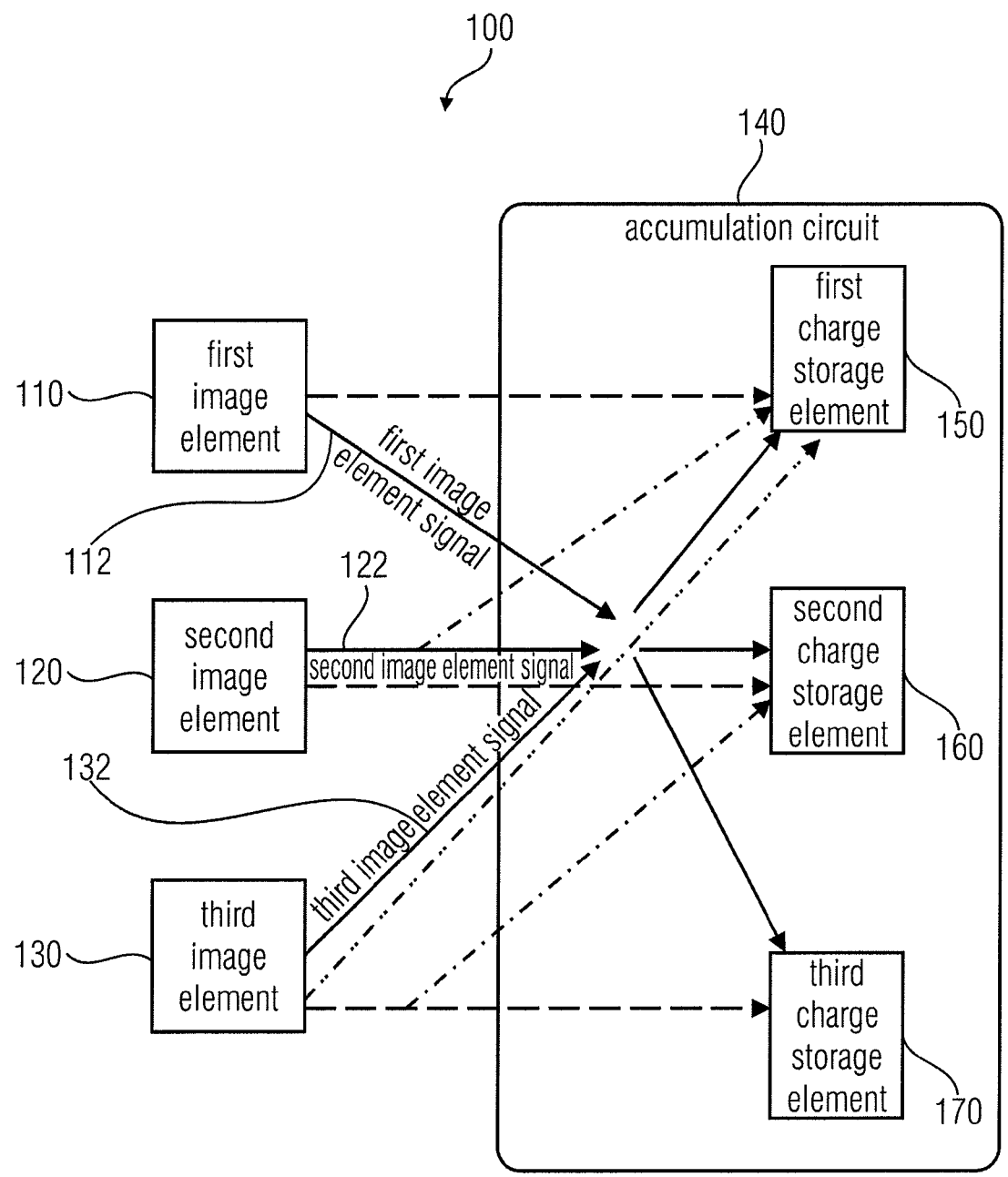
FIG. 1 is a block circuit diagram of an inventive image sensor according to an embodiment of the present invention.

FIG. 1 shows a block circuit diagram of an image sensor according to an embodiment of the present invention. In its entirety, the image sensor according to FIG. 1 is designated 100. The image sensor 100 includes three image elements, or imaging elements, 110, 120, 130. The first image element 110 is configured, for example, to provide a first image element signal 112 which is dependent on a light intensity incident on the first image element 110. Similarly, the second image element 120 is configured to provide an associated second image element signal 122 which is dependent on a light intensity incident on the second image element 120. Finally, the third image element 130 is configured to provide a third image element signal 132 which is dependent on a light intensity incident on the third image element 130.

The image sensor 100 further includes an accumulation circuit 140. The accumulation circuit 140 includes a first charge storage element 150, e.g. a first accumulation capacitor, a second charge storage element 160, e.g. a second accumulation capacitor, and a third charge storage element 170, e.g. a third accumulation capacitor.

The accumulation circuit 140 is configured to change, during a phase, charges on the charge storage elements 150, 160, 170 in dependence on the image element signals 112, 122, 132 of the respective associated image elements 110, 120, 130. In other words, there is an association between the image elements 110, 120, 130 and the charge storage elements 150, 160, 170 in the phase mentioned, so that each of the charge storage elements 150, 160, 170 is associated with at least one image element 110, 120, 130, for example. Alternatively, each of the image elements 110, 120, 130 may be associated with one of the charge storage elements 150, 160, 170 at the most, for example. In one embodiment, for example, there is a plurality of charge storage elements 150, 160, 170, so that each of the plurality of charge storage elements 150, 160, 170 is associated with exactly one of the image elements 110, 120, 130. For example, in a further embodiment, there is a plurality of image elements 110, 120, 130, so that each image element of the plurality of image elements is associated with exactly one of the charge storage elements 150, 160, 170. In a further embodiment, a one-to-one association of image elements 110, 120, 130 with charge storage elements 150, 160, 170 may be present, so that each image element 110, 120, 130 is associated with exactly one charge storage element 150, 160, 170, and further that each of the charge storage elements 150, 160, 170 is associated with exactly one image element 110, 120, 130. However, other associations are possible, e.g. an association of plural image elements with one charge storage element.

For example, in the embodiment shown in FIG. 1, the first charge storage element 150 in the first phase is associated with the first image element 110. The second charge storage element 160, for example, in the first phase is associated with the second image element 120. The third charge storage element 170, for example, in the first phase is associated with the third image element 130. The corresponding association is implied by means of the dashed arrows, for example.

The accumulation circuit 140 is further configured to change the association between charge storage elements and associated image elements in successive phases, so that in operation, a charge on one of the charge storage elements 150, 160, 170 depends on image element signals of plural image elements in a plurality of phases.

In the embodiment shown by FIG. 1, in a second phase following the first phase, for example, the second image element 120 is associated with the first charge storage element 150. Further, in the second phase, for example, the third image element 130 is associated with the second charge storage element 160. The corresponding association is illustrated, for example, by arrows with the pattern "-•-•".

Further, in a third phase, for example, the association between image elements and charge storage elements is changed once again. For example, in the third phase, the third image element 130 is associated with the first charge storage element 150, as is illustrated by an arrow with the pattern "-••-••", for example.

Based on the above-described association between image elements 110, 120, 130 and charge storage elements 150, 160, 170, it will be described in the following how the contents of the charge storage elements 150, 160, 170 are generated.

For example, in the first phase, the first image element 110 is associated with the first charge storage element 150, so that a charge contained, or stored, in the first charge storage element 150 is changed (or built up) in the first phase in dependence on the image element signal 112 of the first image element 110. In the second phase, the first charge storage element 150 is further associated with the second image element 120, so that in the second phase, the charge stored in the first charge storage element 150 is changed in dependence on the second image element signal 122 of the second image element 120. Further, in the third phase, the first charge storage element 150 is associated with the third image element 130, so that a charge stored in the first charge storage element 150 is changed in the third phase in dependence on the third image element signal 132 of the third image element 140. In summary, it may thus be established that the charge stored in the first charge storage element 150 in the first phase is changed in dependence on the first image element signal 112, in the second phase is changed in dependence on the second image element signal 122, and in the third phase is changed in dependence on the third image element signal 132. For example, if it is assumed that the first charge storage element 150 is not reset during the course of the first phase, the second phase and the third phase, then the first charge storage element 150 carries, after the expiration of the three phases mentioned, a charge depending on a light intensity present at the first image element 110 in the first phase, a light intensity present at the second image element 120 in the second phase, and, further, a light intensity present at the location of the third image element in the third phase. If the mapping of an object point moves across the sensor such that the mapping in the first phase is located at the location of the first image element 110, for example, the mapping in the second phase is located at the location of the second image element 120, and in the third phase the mapping is located at the location of the third image element 130, then the charge on the charge storage element 150 substantially describes the object point mentioned, the mapping of which moves over time.

With a view to the second charge storage element 160, it should be noted that the same in the first phase is associated with the second image element 120, and in the second phase is further associated with the third image element 130. Further, the second image element 160 may be associated in the third phase with a fourth image element, for example, here not shown. The charge of the second charge storage element 160 is changed in the first phase substantially in dependence on the second image element signal 122, for example. In the second phase, the charge stored in the second charge storage element 160 is changed substantially in dependence on the third image element signal 132. Thus, for example, a charge stored in the second charge storage element 160 after completion of the second phase is dependent on the second image element signal 122 in the first phase and on the third image element signal 132 in the second phase, for example. Thus, the charge stored in the second charge storage element 160 after completion of the second phase, for example, is dependent on a light intensity at the location of the second image element 120 in the first phase, and is further dependent on the light intensity at the location of the third image element 130 in the second phase. Thus, for example, if a mapping of a further object point moves across the image sensor 100 such that the mapping in the first phase is at the location of the second image element 120, and such that the mapping in the second phase is at the location of the third image element 130, then the charge stored in the second charge storage element 160 after the completion of the second phase is substantially dependent on the mentioned mapping of the further object point. Thus, the charge stored in the second charge storage element 160 after completion of the second phase is a good description of the mentioned mapping moving across the image sensor 100.

In summary, it may thus be established that by the above-described selective and time-varying association between charge storage elements 150, 160, 170 and image elements 110, 120, 130 it may be achieved that in a first phase, for example, the first charge storage element 150 is associated with exactly one image element 110, in a second phase the first charge storage element 150 is associated exactly with another image element 120, and that the first charge storage element 150 in a third phase is associated exactly with another further image element 130. Thereby, in one embodiment, a change of the charge stored in the first charge storage element 150 (apart from a possible reset operation and also apart from parasitic effects) is substantially, or exclusively, dependent on the image element signal of the image element associated in the respective phase. The same also applies to the second charge storage element 160 and the third charge storage element 170, for example.

In summary, it may be established that due to the selective and time-varying (between different phases) association between image elements and charge storage elements, a charge storage element is influenced by image element signals of different image elements in a selective and time-varying manner. Thus, the possibility arises to obtain sharp image information with a view to an object the mapping of which is moving with respect to an imaging surface of the image sensor 100.

It should be understood that within the framework of the above description it is presumed, for example, that an image element not associated with a charge storage element in a particular phase during this phase has no, or only negligible, influence on a change of the charge stored in the respective image element. However, this is not inevitably necessitated, and other embodiments are conceivable.

Figure 2:
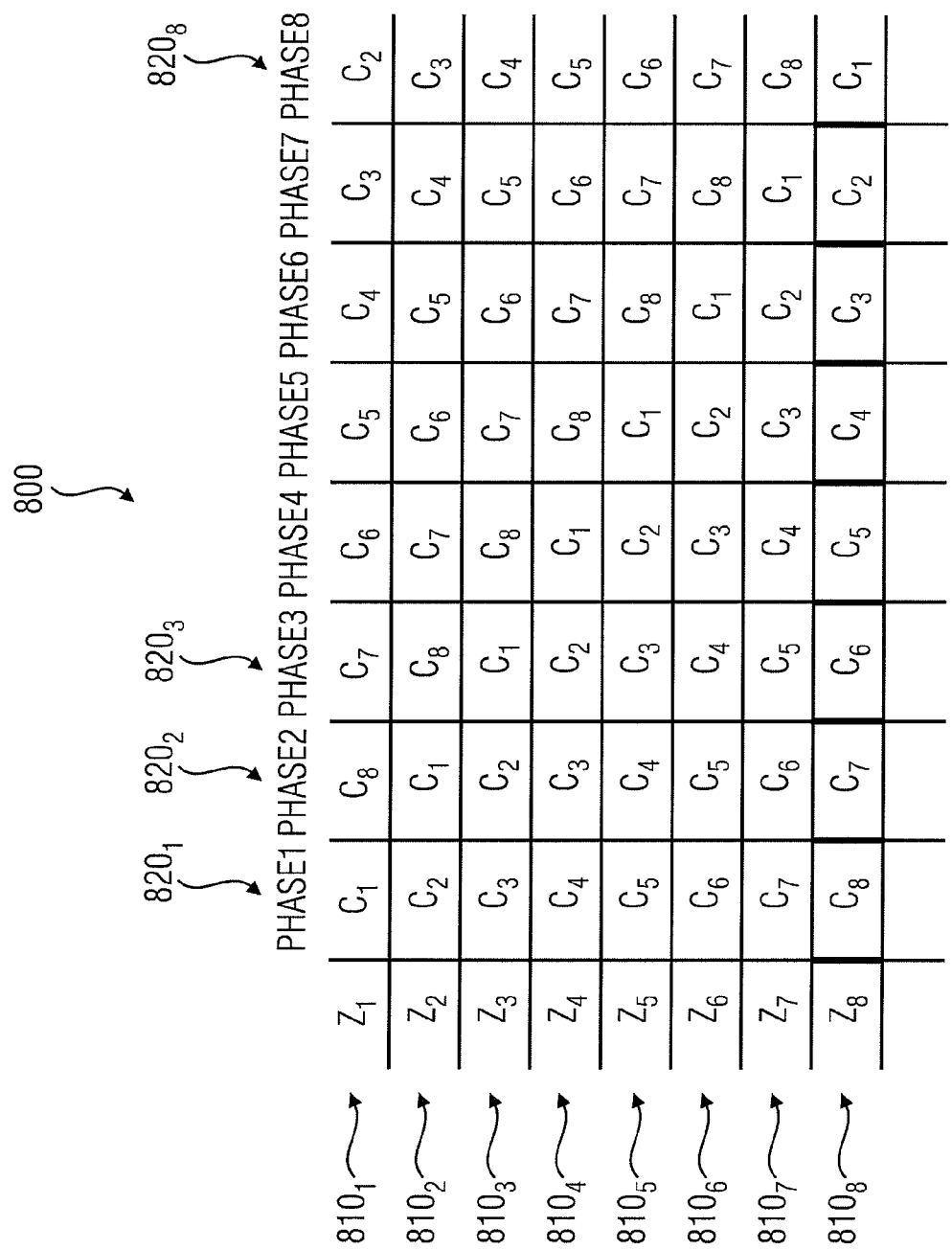
FIG. 2 is a table illustration of a possible association between image elements and charge storage elements for different phases, according to an embodiment of the present invention.

In the following, a possible association between image elements and the charge storage elements will be described with reference to FIG. 2. FIG. 2 shows a graphic illustration of a possible association between image elements and the charge storage elements, according to an embodiment of the present invention. The embodiment shown with reference to FIG. 2 relates to an image sensor (or an image-sensor part) including eight image elements belonging together, or grouped together. The image elements are designated $Z_1$ to $Z_8$. Further, it is assumed that eight charge storage elements are present, designated $C_1$ to $C_8$. Further, it is assumed that there is a one-to-one association between image elements and charge storage elements. In different rows of the table illustration according to FIG. 2, those charge storage elements are indicated, for example, which in the different phases (phase 1 to phase 8) are associated with the corresponding image elements. For example, a first row $810_1$ describes which charge storage elements are associated with the first image element $Z_1$ in the different phases. Accordingly, a first $Z_n$-th row $810_n$ (n=1, ..., 8) relates to a n-th image element. A first column $820_1$ describes which charge storage elements $C_1$-$C_8$ are associated with the different image elements $Z_1$-$Z_8$ in the first phase (phase 1). Further columns $820_2$-$820_8$ describe the association for different further phases. In the first phase described by the column $820_1$, the image elements $Z_1$-$Z_8$ are associated with the charge storage elements $C_1$-$C_8$, for example. In the second phase $820_2$, the first image element $Z_1$ is associated with the eighth charge storage element $C_8$, for example. In the second phase, the second to eighth image elements $Z_2$-$Z_8$ are further associated with the first to seventh charge storage elements $C_1$-$C_7$. The corresponding association for further phases may be seen from the table illustration 800.

For example, from the table illustration 800 it is apparent that in one embodiment, the association between image elements and charge storage elements rotates cyclically upon transition from a previous phase to a subsequent phase. For example, if it is assumed that due to their geometric arrangement, for example, the image elements form an ordered order, beginning with a first image element (e.g. the first image element $Z_1$) and ending with a last image element (e.g. the eighth image element $Z_8$), then, in one embodiment, for example, an image element (e.g. $Z_3$) following a previous image element (e.g. $Z_2$) in a following phase (e.g. phase 2) is associated with the same charge storage element which was associated with the previous image element in the previous phase. In the following phase, the first image element is associated with a charge storage element which in the previous phase was associated with the last image element.

However, it should be noted that the corresponding association may also be reversed in order, for example, so that a previous image element, for example, in a following phase (e.g. phase 2) is associated with the same charge storage element which was associated with the subsequent image element (e.g. $Z_2$) in the previous phase (e.g. phase 1). In this case, for example, the last image element in the sub-sequent phase is associated with the same charge storage element which was associated with the first image element in the previous phase.

However, it should be understood that in some embodiments, there may be also alterations to the cyclic association. For example, more charge storage elements than image elements may be present, wherein a cyclic association may still be present.

Figure 3:
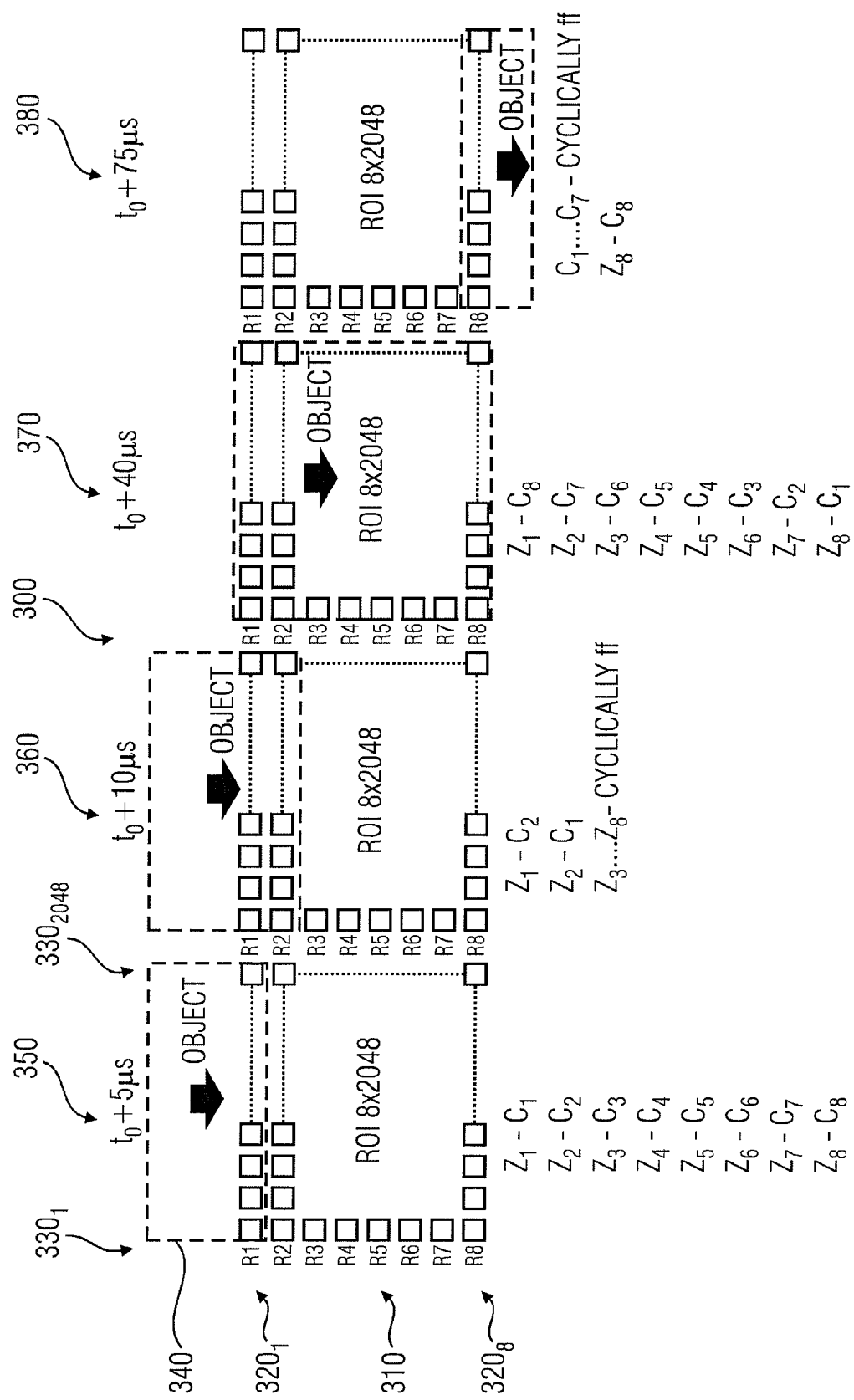
FIG. 3 is a schematic illustration of a motion advance in an image readout with a time-delayed integration (TDI image readout)

In the following, it will be described with reference to FIG. 3 how a mapping of an object may pass across an image sensor. For this purpose, FIG. 3 shows a schematic illustration describing the motion of the object. In its entirety, the schematic illustration according to FIG. 3 is designated 300. The schematic illustration 300 shows an image sensor 310 comprising eight rows $320_1$-$320_8$, for example. The image sensor 310 further comprises 2,048 columns $330_1$-$330_{2048}$. Eight image elements of the first column $330_1$ are designated $Z_1$-$Z_8$ (in a top view of the image sensor), for example. The image elements are arranged in the manner shown, for example, so that the image elements $Z_1$-$Z_8$, for example, are arranged along a line, or along a column, of the image sensor. An object, or a moving mapping of an object, is designated 340.

A first schematic illustration 350 describes a state at a point in time $t_0+5$ μs, a second graphic illustration 360 describes a state at a point in time $t_0+10$ μs, a third graphic illustration 370 describes a state at a point in time $t_0+40$ μs, and a fourth graphic illustration 380 describes a state at a point in time $t_0+75$ μs.

For example, if a CMOS square pixel (e.g. the image elements $Z_1$-$Z_8$) with 10 μm edge length designed in a modern fabrication process is assumed, and if it is further assumed that high-speed applications work at object advance speeds of one to two m/s in the inspection, for example, then, in a simplifying assumed mapping scale of 1 for a speed of 2 m/s, a row-synchronized speed of 2 μm/μs, or—in relation to an image element division or a pixel division (pixel pitch) of 10 μm—10 μm/5 μs results. In an exemplarily assumed accumulation across eight rows, a requirement to read out eight lines in 5 μs derives from this. Further, for a complete accumulation sequence, a duration of eight rows multiplied by 5 μs=40 μs follows. Thus, in a first embodiment, a first row of the object (or of the mapping of the object) has completely passed a TDI image section after 40 μs, is ready-accumulated and may be read out, or is read out.

Furthermore, the object image is now successively further accumulated row by row. In other words, after eight cycles, the object (or its mapping) has moved completely into the TDI range, for example, as is shown, for example, in the third graphic illustration 370 (provided that with a square pixel, the speed of the object mapping is exactly one row pitch or one image element division (pixel pitch) in 5 μs). In summary, it may thus be established that FIG. 3 shows an exemplary motion advance in a TDI image readout. Here, FIG. 3 illustrates a motion sequence with a synchronously proceeding accumulation in a CDS stage for the case of a monochrome readout.

It should be understood that the graphic illustration of FIG. 3 also shows an association between image elements $Z_1$-$Z_8$ and charge storage elements $C_1$-$C_8$. The association shown may replace the association described with reference to FIG. 2, for example. Alternatively, the association described with reference to FIG. 2 may also be used.

Figure 4:
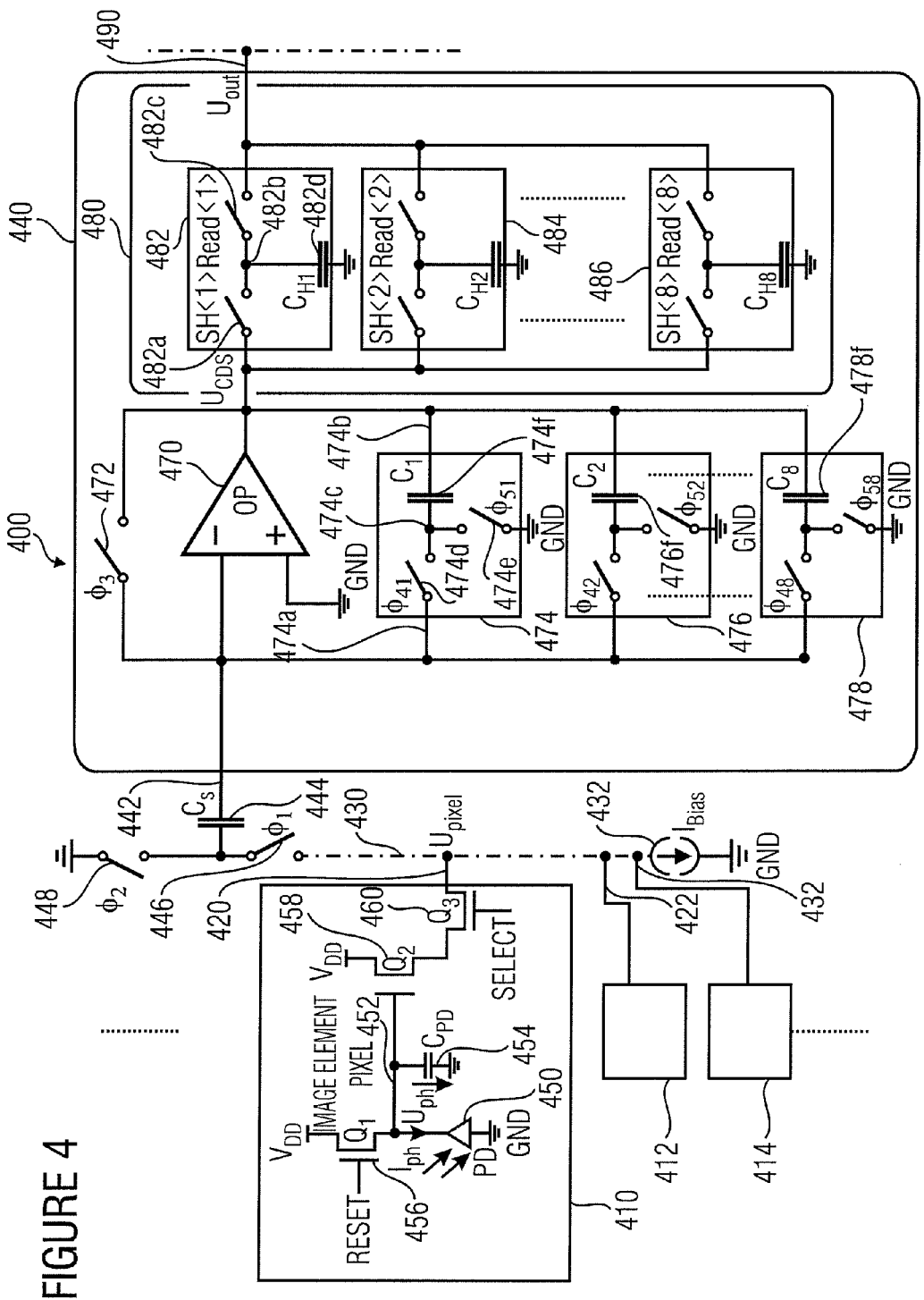
FIG. 4 is a circuit diagram of an image sensor according to an embodiment of the present invention.

FIG. 4 shows a circuit diagram of an image sensor, according to an embodiment of the present invention. According to an embodiment of the present invention, FIG. 4 shows an image element, or a pixel, with a correlated double sampling stage and an accumulation storage.

The circuitry according to FIG. 4, or the image sensor according to FIG. 4, is designated 400 in its entirety. For example, the image sensor 400 includes a first image element 410, a second image element 412 and a third image element 414. In one embodiment, the image elements 410, 412, 414 are constructed substantially in an identical manner, so that only the first image element 410 will be described in the following. An image signal output 420 of the first image element 410, an image signal output 422 of the second image element 412 and an image signal output 432 of the third image element 414 are coupled to a common column line 430, for example, or are operatively electrically connected. Via a current source 432 providing an operating-point current $I_{bias}$, for example, the column line 430 is further connected to a reference potential GND.

The image sensor 400 further includes an accumulation circuit 440. Via a coupling capacitor 444 and a first (optional) switch 446, for example, an input 442 of the accumulation circuit 440 is coupled to the common column line 430. Here, a first terminal of the storage capacitor 444 is coupled to the input 442 of the accumulation circuit 440, and a second terminal of the storage capacitor 444 is coupled directly, or via the first optional switch 446, to the common column line 430. Further, the second terminal of the storage capacitor 444 is optionally coupled to the reference potential GND via a second switch 448. It should be understood that the first switch 446 is controlled with a control signal $\Phi_1$, for example, while, in contrast, the second switch 448 is controlled with a control signal $\Phi_2$, for example.

In the following, the inner structure of the first image element 410 will be exemplarily explained in place of the plural image elements 410, 412, 414 present. For example, the first image element 410 may be a three-transistor cell with a rolling-shutter technique. For example, the first image element 410 includes a photo diode 450, wherein an anode terminal of the photo diode is coupled to the reference potential GND, and wherein a cathode terminal of the photo diode 450 is coupled to a storage node 452. Further, a storage capacitor 454 configured to store a corresponding photo voltage $U_{ph}$ based on the photo current $I_{ph}$ provided by the photo diode is connected in parallel to the photo diode. The storage node 454 is further connected to a source terminal of a reset transistor 456. A drain terminal of the reset transistor 456 ($Q_1$) is connected to a positive supply potential $V_{DD}$, for example. A gate terminal of the reset transistor 456 is connected, for example, to a "reset" signal controlling the reset of the image element 410. The image element 410 further includes a unity gain amplifier transistor (or voltage-follower transistor) 458 which may be an NMOS field effect transistor as well, for example. A gate terminal of the unity-gain amplifier transistor 458 is coupled to the storage node 454, for example. A drain terminal of the unity gain amplifier transistor 458 is coupled to the potential $V_{DD}$, for example. A source terminal of the unity gain amplifier transistor is further coupled to a first channel terminal of a switching transistor 460. A second channel terminal of the switching transistor 460 is coupled to the common column line 430, for example. At a gate terminal of the switching transistor 460, a signal "select" turning the switching transistor 460 on or off and, thus, activating or deactivating a coupling between the first image element 410 and the column line 430 is present.

With a view to the functioning of the image element 410, it should be established that upon resetting (i.e. activating the "reset" signal at the gate terminal of the resetting transistor 456), the capacitor 454 is charged. If the photo diode 450 is exposed subsequent to the reset, then the photo diode 450 will discharge the capacitor 454 by its photo current $I_{ph}$. Thus, after the reset, a reset potential is present at the storage node 454. Subsequent to the reset, the potential changes depending on the photocurrent delivered by the photo diode 450, depending on a light intensity of the light incident on the photo diode 450. Thus, after a certain exposure time, a voltage level dependent on the light intensity sets in at the storage node 454. If the switch 460 is closed, then the unity gain amplifier transistor 458 will act, in connection with the current source 432, as a source follower, so that a voltage present at the column line 430 substantially follows the voltage at the storage node 454. Thus, the common column line 430 may be brought to a voltage level which depends on the voltage at the storage node 454.

In the following, details of the accumulation circuit 440 will be described. The accumulation circuit 440 includes an operational amplifier 470 comprising an inverting input (−) and a non-inverting input (+) as well as an output, for example. The inverting input (−) of the operational amplifier 470 is coupled to the input 442 of the accumulation circuit 440, for example. The non-inverting input (+) of the operational amplifier 470 is coupled to the reference potential GND (or another pre-given potential), for example. The accumulation circuit 440 includes a feedback-path switch 472 coupled between the inverting input (−) of the operational amplifier 470 and the output of the operational amplifier 470 to connect the inverting input (−) with the output. The feedback-path switch is controlled by a control signal $\Phi_3$, for example.

The accumulation circuit 440 further includes a plurality of switched capacitor arrangements (briefly also referred as switched capacitors). For example, in FIG. 4, three switched capacitor arrangements 474, 476, 478 are shown, which may be switched, respectively, into a feedback path of the operational amplifier 470, i.e. between the inverting input of the operational amplifier 470 and the output of the operational amplifier 470.

In their structure, the switched capacitor arrangements 474, 476, 478 are identically constructed, so that only the structure of the first switched capacitor arrangement 474 will be described in the following. The first switched capacitor arrangement 474 includes an associated input 474a and an associated output 474b. Further, the first switched capacitor arrangement 474 includes an associated inner node 474c. The first switched capacitor arrangement 474 further includes a first switch 474d, a second (optional) switch 474e and a capacitor 474f. Here, the first switch 474d is connected between the input terminal 474a and the inner node 474c. The capacitor 474f is further connected between the inner node 474c and the output terminal 474b. The optional second switch 474e is connected between the inner node 474c and a pre-given potential, e.g. the reference potential GND. The first switch 474d is controlled by a control signal $\Phi_{41}$, for example, and the second switch 474e is controlled by a further control signal $\Phi_{51}$, for example.

Thus, the capacitor 474f of the first switched capacitor arrangement 474 may be switched into the feedback branch of the operational amplifier 470 by closing the first switch 474d of the first switched capacitor arrangement. By closing the second switch 474e (e.g. with the first switch 474d open), the capacitor 474f may further be pre-charged to the output voltage at the output of the operational amplifier 470. Thus, the capacitor 474f may be placed in a reset state, for example.

In summary, it may thus be established that the capacitor 474f may be switched into the feedback branch of the operational amplifier 470 by activating the control signal $\Phi_{41}$, and further, the capacitor 474f may be placed in a reset state by activating the control signal $\Phi_{51}$.

In a corresponding manner, a capacitor 476f may be switched into the feedback branch of the operational amplifier 470 by activating a control signal $\Phi_{42}$, and may be placed in a reset state by activating a control signal $\Phi_{52}$. A capacitor 478f of the third switched capacitor circuit 478 may further be switched into the feedback branch of the operational amplifier 470 by activating a control signal $\Phi_{48}$, and may be placed in a reset state by activating a control signal $\Phi_{58}$.

For example, in connection with a capacitor switched into the feedback branch (e.g. the capacitor 474f, the capacitor 476f or the capacitor 478f), the operational amplifier 470 may substantially act, with an opened feedback-path switch 472, as a current integrator with a low input impedance, so that a current delivered via the input 442 leads to a change of a charge stored in the capacitor switched into the feedback branch. In other words, a charge fed to the accumulation circuit in this state via the input 442 is stored, or accumulated, in the capacitor switched into the feedback branch.

The accumulation circuit 440 further optionally includes a readout circuit 480 coupled to the output of the operational amplifier 470 to sample and latch the voltage present at the output of the operational amplifier 470. For example, the readout circuit 480 includes a plurality of readout arrangements 482, 484, 486, only one of which will here be exemplarily described. For example, the readout arrangement 482 includes a sample switch 482a, an inner node or storage node 482b, a read switch 482c and a readout capacity 482d. The sample switch 482a is connected between the output of an operational amplifier 470 and the inner node or storage node 482b, for example. Further, the readout capacity 482d is connected between the inner node or storage node 482b and a solid potential (e.g. the reference potential GND). The read switch 482c is further connected between the inner node or storage node 482b and an output terminal 490 of the accumulation circuit 440. The sample switch 482 is controlled by a signal "SH<1>", for example, and the read switch 482c is controlled by a signal "read <1>", for example. The further readout circuitries 482, 486 are connected in parallel to the first readout circuitry 482 described above. The corresponding readout switches of the second and the third readout circuitry are controlled by signals "SH<2>" or "SH<8>", for example, as may be seen from FIG. 4. Readout switches of the readout circuitries 482, 486 are controlled by corresponding read signals "read<2>" or "read<8>". Thus, on the whole, the readout circuit 480 is configured to sample the output signal of the operational amplifier 470 at different points in time by correspondingly closing of the sample switches, and to latch the voltage present at the output of the operational amplifier 470 on corresponding readout capacitors 482d. The voltage latched on the readout capacitor 482d may also be output to the output 490 of the accumulation circuit 440 by closing the sample switches, or read switches, 482c.

Figure 5:
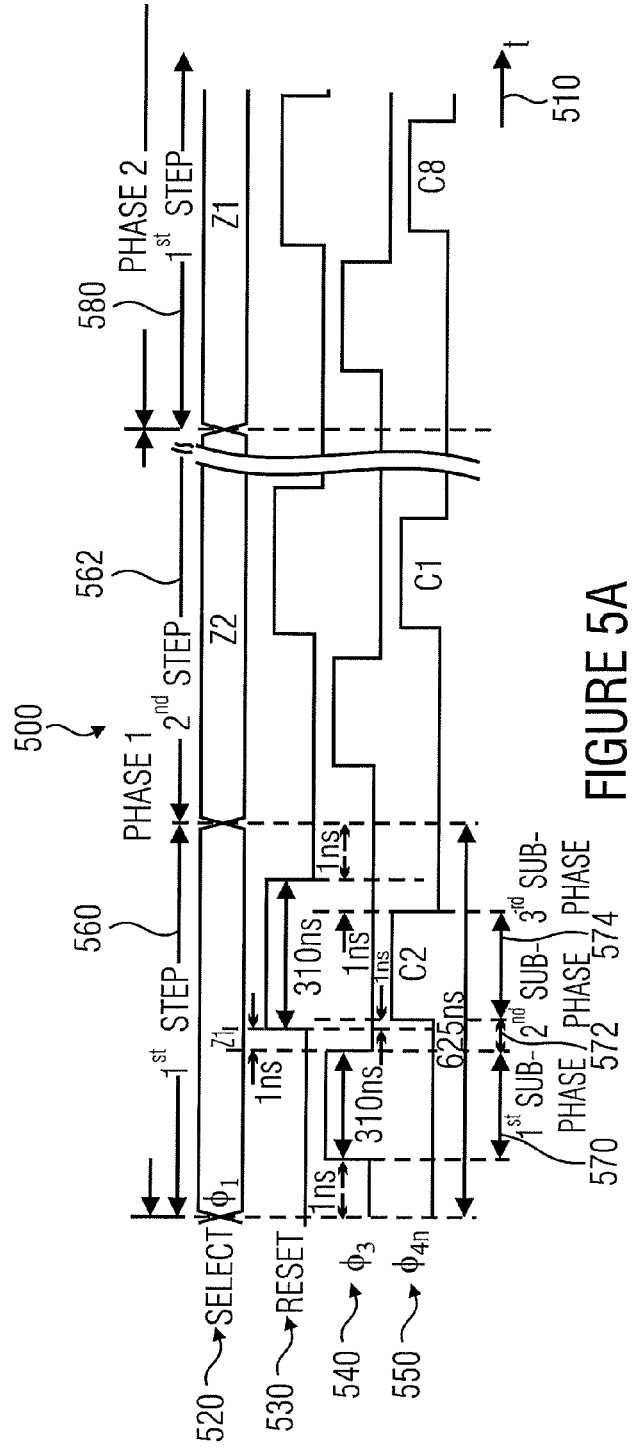
FIG. 5a is a graphic illustration of signal waveforms as may occur in an embodiment of the invention in the circuitry according to FIG. 4.
FIG. 5b is a graphic illustration of control flows as may occur in an embodiment of the invention in the circuitry according to FIG. 4.

Based on the above description, in the following the functioning of the image sensor 400 will be explained in more detail with reference to different timing diagrams. As such, FIG. 5a shows a graphic illustration of time waveforms of different signals which may occur in the image sensor 400 according to FIG. 4, for example. In its entirety, the graphic illustration according to FIG. 5 is designated 500. In FIG. 5, a common abscissa 510 describes the time. A first signal waveform illustration 520 describes the select signals of the image elements 410, 412, 414. With respect to this, it should be understood that in one embodiment, one image element from a plurality of image elements 410, 412, 414 coupled to a common column line 430 is selected at the most at a point in time. In other words, the image elements 410, 412, 414 coupled to a common column line 430 obtain separate select signals, only one of which is active at the most to select an image element. The select signals thus serve to select one of the image elements. For example, if in the signal waveform illustration 520 a value of "$Z_1$" is indicated for the select signals, this indicates that the first image element $Z_1$ is selected, while, in contrast, the other image elements connected to the same common column line are not selected. Correspondingly, a value of "$Z_2$" indicates that a second image element (e.g. the image element 412) is selected and, thus, coupled to the common column line, while, in contrast, the other image elements are not selected.

A second signal waveform illustration 530 describes a control signal "reset" controlling the reset transistor 456, for example. For example, the "reset" signals may be the same for all image elements, or individual image elements may be provided with separate "reset" signals.

A third signal waveform illustration 540 describes a time waveform of a control signal $\Phi_3$ controlling the feedback-path switch 472, for example. A fourth signal waveform illustration 550 describes the control signals for the switchable capacitor arrangements 474, 476, 478. The signals $\Phi_{4n}$ thus indicate which of the capacitors 474f, 476f, 478f is switched into the feedback path of the operational amplifier 470. Thus, as a rule, it may be presumed that one of the control signals $\Phi_{41}, \Phi_{42}, \ldots, \Phi_{48}$ (collectively also designated $\Phi_{4n}$) at the most is active at one point in time. Thus, an indication "$C_2$" in the fourth signal waveform illustration 450 indicates that the capacitor 476f (also designated $C_2$) is switched into the feedback path of the operational amplifier 470 by activating the associated control signal $\phi_{42}$, while, in contrast, the other capacitors 470f, 478f are not switched into the feedback path. In contrast, an indication "$C_1$," in the fourth signal waveform illustration 450 indicates that the capacity 474f (also designated $C_1$) is switched into the feedback path, while, in contrast, the other capacities 476f, 478f are not switched into the feedback path.

In the following, a phase in the operation of the circuitry 400 will be described with reference to FIG. 5a. Here, the phase means "row cycle", for example. During a phase, plural (if not all) image elements connected to the common column line 430 are evaluated, and during a phase, charges on the capacitors 474f, 476f, 478f of the switched capacitor arrangement 472, 474, 476 are changed depending on signals of the image elements 410, 412, 414. For example, the first phase includes a first step in which signals from a first image element 410 are evaluated, and a second step in which signals from the second image element 412 are evaluated, for example. The first step is designated 560 in the graphic illustration 500 of FIG. 5a, and the second step is designated 562.

In the following, details with a view to the first step 560 will be explained. For example, during the first step 560, the first image element 410 is selected, as may be seen from the time waveform of the "select" signal illustrated in the first time waveform illustration 520. In other words, the select switch 460 of the first image element 410 is closed, for example, so that the first image element 410 is coupled to the common column line 430. For example, in a first sub-phase 570 of the first step 560, the control signal $\Phi_3$ is active, so that the feedback-path switch 472 is closed. Accordingly, the operational amplifier 470 is immediately fed back, so that a voltage is present at the inverting input (−) of the operational amplifier 470 which is different from a voltage present at the non-inverting input (+) of the operational amplifier 470 substantially by the offset voltage of the operational amplifier 470. During the first step (as also during the following steps), the control signal $\Phi_1$ is active, so that the switch 446 is closed. For example, at the output 420 of the first image element 410, a voltage based substantially on the voltage at the storage node 454 of the first image element 410, and, thus, depending on a light intensity incident on the photo diode 450 (during an exposure period), for example, is present. Thus, the storage capacity 444 is charged to a voltage substantially equal to a potential difference of a potential present on the common column line 430 and a potential present on the inverting input of the operational amplifier 470. At the end of the first sub-phase 570, the control signal $\Phi_3$ is deactivated, so that the feedback-path switch 472 is opened.

During a second sub-phase 572 subsequent to the first sub-phase 570, the signal "reset" is activated, whereby the reset transistor 456 becomes active, for example. Thus, for example, the voltage on the common column line 430 changes to a reset value. In one embodiment, the charge stored on the storage capacitor 444 initially remains approximately constant since during the second sub-phase 572, both the control signal $\Phi_3$ and the control signals $\Phi_{41}$-$\Phi_{48}$ are inactive.

In a third sub-phase 575, for example, the control signal $\Phi_{42}$ is activated, and, thus, the second capacitor 476$f$ ($C_2$) is switched into the feedback path of the operational amplifier 470. Thereupon, a charge equalization between the storage capacitor 444 and the capacitor 476$f$ ($C_2$) occurs. For example, a charge fed to the capacitor 476$f$ ($C_2$) is at least approximately proportional to a difference between a potential taken on by the common column line 430 during the first sub-phase 570, and a potential taken on by the common column line 430 in the third sub-phase 574 (i.e. with an activated "reset" signal), for example. Thus, on the whole, the charge on the capacitor 476$f$ ($C_2$) is also changed in dependence on the signal at the output 420 of the first image element 410. The charges on the remaining capacitors 474$f$, 478$f$ switchable into the feedback path of the operational amplifier 470 remain, in the first step 560, substantially unchanged (apart from parasitic changes), since the control signals $\Phi_{41}$, $\Phi_{51}$, $\Phi_{48}$ and $\Phi_{58}$ are inactive during the first step, for example.

For example, at the end of the third sub-phase 574, the control signal $\Phi_{42}$ is deactivated, so that no capacitor is switched into the feedback path of the operational amplifier 470 any longer. Subsequent to the third sub-phase 574, the "reset" signal is deactivated, as may be seen from the second signal waveform illustration 530, for example.

With a view to the relative timing relations, reference is made to the signal waveform illustrations 520, 530, 540, 550. The time waveform illustrations 520, 530, 540, 550 include exemplary (yet not compelling) indications describing the time intervals between particular edges of the signals shown.

In principle, time waveforms in the second step 562 correspond to the time waveforms in the first step 560. However, in the second step 562, the second image element 412 ($Z_2$), for example, is selected (while the remaining image elements which may be coupled to the common column line 430 are separated from the common column line 430, e.g. by opening the corresponding switches). Further, in the second step 562, the charge of the capacitor 574$f$ ($C_1$) is changed, yet the charge of the capacitor 476$f$ ($C_2$), in contrast, is not. The corresponding time waveforms of the control signals are apparent from the time waveform illustrations 520, 530, 540, 550.

The graphic illustration 500 further shows a first step 580 of a second phase. In the first step 580 of the second phase, in turn, the first image element 410 is selected, such as in the first step 560 of the first phase, as is apparent from the first signal waveform illustration 520 ($Z_1$). However, in the first step 580 of the second phase, the capacitor 478$f$ ($C_8$) is switched into the feedback path of the operational amplifier 470, which is different from the first step 560 of the first phase. Accordingly, in the first step 580 of the second phase, the charge of the capacitor 478$f$ ($C_8$) is changed in dependence on signals provided by the first image element 410. Thus, it is generally apparent that an association between image elements and associated capacitors switched into the feedback path of the operational amplifier 470 is changed in the second phase compared to the first phase.

In the following, an exemplary association between image elements and capacitors switched into the feedback path of the operational amplifier 470 will be described with reference to FIG. 5$b$. In this context, it is exemplarily assumed that eight image elements $Z_1$-$Z_8$ are coupled to the common column line 430 and further eight different capacitors $C_1$-$C_8$ may be switched into the feedback branch of the operational amplifier 470, wherein control signals $\Phi_{41}$-$\Phi_{48}$ (generally referred to as $\Phi_{4n}$) are used to switch exactly one of the capacitors $C_1$-$C_8$ into the feedback branch of the operational amplifier 470, for example.

In its entirety, the graphic illustration of FIG. 5$b$ is designated 590. A first row 592 describes which of the image elements $Z_1$-$Z_8$ was selected in a particular step (e.g. in the first step S1 up to the eighth step S8) of a particular phase (e.g. from phase 1 to phase 8). The selection is made with the aid of suitable control signals, as has already been explained with reference to FIGS. 4 and 5$a$. For example, in the first step of the phases, the first image element $Z_1$ may be respectively selected, as it is apparent from FIG. 5$b$. In general, the n-th image element $Z_n$ may be selected in plural phases in the n-th step, for example.

A second row 594 describes which of the capacitors $C_1$-$C_8$ are selected in the respective steps of the different phases. Details with a view to the time waveforms concerning the selection of capacitors have already been explained above with reference to FIGS. 4 and 5$a$. As is apparent from FIG. 5$b$, the capacitors $C_1$-$C_8$ are selected one after the other during the first phase in the individual eight steps of the first phase, for example. In the second phases, the capacitor $C_8$ is selected in a first step S1, and subsequently, the capacitors $C_1$-$C_7$ are selected one after the other. In contrast, in an eighth phase, the capacitors $C_2$-$C_8$ are selected one after the other in the first seven steps S1 to S7, and subsequently, the capacitor $C_1$ is selected. It is apparent from FIG. 5$b$ that an association between image elements and capacitors switched into the feedback branch is cyclically changed between the different paths, as is apparent from FIG. 5$b$, for example, and as has already been explained with reference to FIG. 2.

In summary, it may be established that FIGS. 3, 4, 5a and 5b illustrate a motion sequence with synchronously proceeding accumulations in a CDS stage for a case of a monochrome readout. As such, a motion advance in a TDI image readout became apparent both with reference to FIG. 3 and with reference to FIG. 5a.

Without any restrictions to generality, the method explained herein also applies to a color readout. For example, a TDI exposure sequence begins at a point in time $t_0$. After to +5 µs (or at a point of time $t_0$+5 µs), the object (e.g. the object shown in FIG. 3) has swept over a first row of a region of interest for the time-delayed integration (TDI-ROI). For example, FIG. 5a shows a detailed time scheme of an accumulation for a period of time from to +5 µs. At the end, that is, after eight cycles for example, each of the eight rows of the object plane, for example, has been accumulated at least twice using RBB filters. When reaching the eighth row of the selected region of interest (ROI), a first row of the object plane was accumulated on the chip for the last time, that is, for the second (eighth) time or after 40 µs. Thus, from the next row, a readout of the first row may be started. Therefore, 5 µs are available for a readout, for example, until a next ready-accumulated row is read out. For example, an analogue pipeline is filled up, and the sample and hold capacities (e.g. $C_{H1}$-$C_{H8}$) corresponding to the accumulation capacities (e.g. $C_1$-$C_8$) are accumulated and read out. For example, this corresponds to a row readout time of 5 µs. The above-described operation proceeds in cycles, for example, until it is interrupted by an action from outside (e.g. by stopping the inspection object). Likewise, a TDI readout may be incorporated into an outer locked loop taking a variable object speed into consideration.

An analogue readout circuit realizing an interleaved TDI readout method on a chip, for example, is shown in FIG. 4. The circuit according to FIG. 4 uses the possibility of designing a signal path for accumulator capacities, or accumulation capacities, $C_1$-$C_8$ in the CMOS technique with switched capacitors (also referred to as CMOS switched-capacitor technique). A standard CMOS image element, or a standard CMOS pixel, which in the example shown is embodied as a three-transistor cell with a rolling shutter technique, is read out via a CDS stage (correlated double-sampling stage). Alternatively, the image element, or the pixel, may also be designed as a four-transistor cell with a synchronous shutter or as a pinned photodiode, photogate, or with an N well photo diode. In a column-parallel arrangement, for example, the image element, or the pixel, is read out to the associated CDS stage, and a signal value is accumulated up depending on the position of an object on one of the feedback capacities $C_1$-$C_8$.

In the following, a mode of operation will first be explained with reference to a linearly integrating image element (pixel) with a rotating shutter (rolling shutter). For an accumulated voltage, $$U_{CDS}(i, j) = \frac{C_s}{C_i} \cdot \sum_{j=1}^{n} U_{DCS}(i), \quad (2.1)$$

$i := 1 \ldots 8(\text{capacity}), j := 1 \ldots 8(\text{row})$ holds true, for example.

For example, pixels of a first row (row 1) are transmitted onto the storage capacity 444 ($C_s$) of the respective column, wherein the signal "select" and, further, the signals $\Phi_1$ and $\Phi_3$ are active, or in a high state. If the respective signals "select" and $\Phi_1$ and $\Phi_3$ are active, or in a high state, then the storage capacities 474f, 476f, 478f, or $C_1$-$C_8$, for example, remain discharged, or in a reset state.

With an activated "select" signal, the phase (or the signal) $\Phi_3$ is subsequently deactivated. Further, $\Phi_{41}$ and the signal "reset", for example, are activated. Thus, for example, a readout of a reset state of the image element, or pixel, occurs, whereby additive errors and low-frequency noise portions are suppressed, for example (a so called CDS cycle). In the present switching state, for example, a charge difference from the signal state and the reset state, or the reset state of the pixel, is placed on the storage capacity 474f ($C_1$) of the CDS stage. For example, an equivalent voltage is corrected by an offset an image element source follower, or a pixel source follower, 458 ($Q_2$). Hereby, a fixed pattern noise originating from the image element, or pixel, may be compensated, for example. After the correlated double sampling (CDS) occurred for a first row $Z_1$, the operation recurs after a row cycle pre-given by an object speed. In the example described, the row cycle time is 625 ms, for example. For example, after 5 µs=8*625 ns, the object has completely swept over the second row $Z_2$ (or a row including the second image element $Z_2$), and a readout of row $Z_2$ begins. First, output signals of the image elements, or pixels, are again transmitted onto respective sample capacities $C_s$ in a column-parallel manner (wherein the signals "select" as well as $\Phi_1$ and $\Phi_3$, for example, are active or in a high state). Afterwards, an offset compensation and an accumulation occur. This time, however, an accumulation of the pixel row $Z_2$ occurs on the capacities 474f ($C_1$) of the column-parallel CDS stages, and the accumulation of the pixel row $Z_1$ occurs on the capacities 476f ($C_2$), since the object has moved on.

This represents a significant advantage over an external digital accumulation of a conventional image sensor, since in some embodiments of the invention, the analogue signal processing is completely realized on the sensor chip. Further, a signal of the photo detector (e.g. the charge integrated in the image elements, or pixel) is converted to a voltage by means of the source follower 458 ($Q_2$) already during a readout. The same is not reconverted back to a charge until the CDS stage, and there, is accumulated in packets. A bucket-brigade principle utilizing charge-coupled means (CCDs) and bringing about a significant wanted-signal loss is thus avoided according to the principle.

The CDS stage is connected to an analogue intermediate buffer stage with capacitors $C_{H1}$-$C_{H8}$, which, in connection with the switches SH<1> to SH<8>, latches ready-accumulated signals for a readout.

In summary, it may be established that by implementing the TDI method in a CMOS sensor technology, improvements over the conventional solutions include an optimized signal gain by avoiding a bucket-brigade principle and substantially higher working speeds compared to the CCD TDI sensors, among other things.

Figure 6:
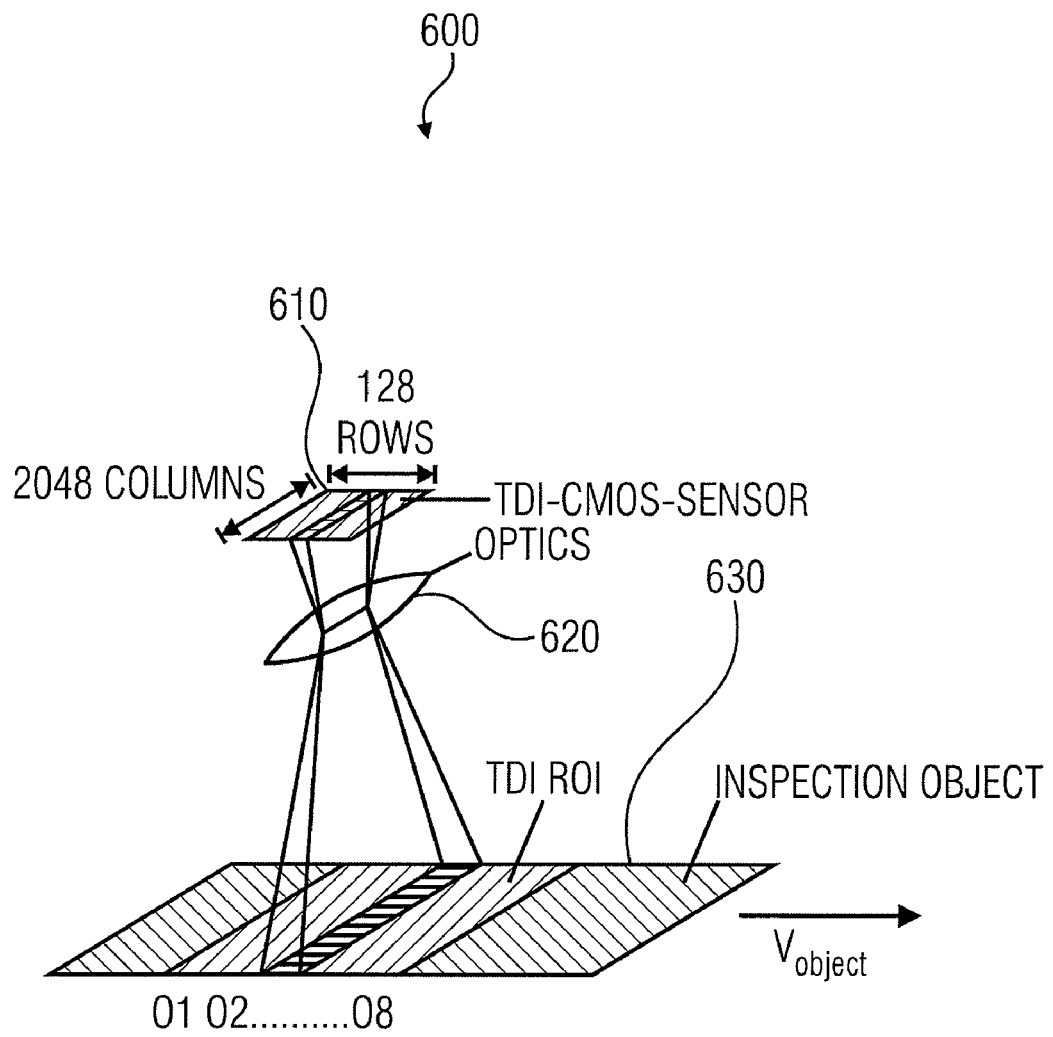
FIG. 6 is a schematic illustration of an object inspection means using a TDI CMOS sensor, according to an embodiment of the present invention.

In the following, an embodiment of a TDI CMOS sensor with 128×2,048 pixels will be described with reference to FIGS. 6 and 7. FIG. 6 shows a schematic illustration of a TDI CMOS sensor for an object inspection. In its entirety, the sensor arrangement according to FIG. 6 is designated 600. The arrangement 600 includes a TDI CMOS sensor 610 comprising 128 rows and 2,048 columns, for example. The arrangement 600 further includes an optics 620 configured to map a part of an inspection object 630 onto a sensor surface of the TDI CMOS sensor 610. For example, the optics 620 may be configured to map a TDI region of interest (TDI ROI or TDI region of interest) onto a sensitive sensor surface of this TDI CMOS sensor.

On the basis of the afore-mentioned considerations, an architecture of a TDI CMOS sensor may be designed by example of an object inspection. This is schematically shown by FIG. 6 for the instance of a surface control on a fast-moving conveyor belt. The conveyer belt carrying the objects to be inspected (also referred as to inspection objects 630), such as bank notes, print products, assemblies or similar, has a transport speed $v_{object}$, for example. By means of a synchronization and/or control unit, here not shown, a row readout cycle of the TDI CMOS sensor is regulated according to the transport speed, for example. For an image capturing operation and a readout operation, the above-explained successively proceeding TDI method is applied, for example.

Figure 7:
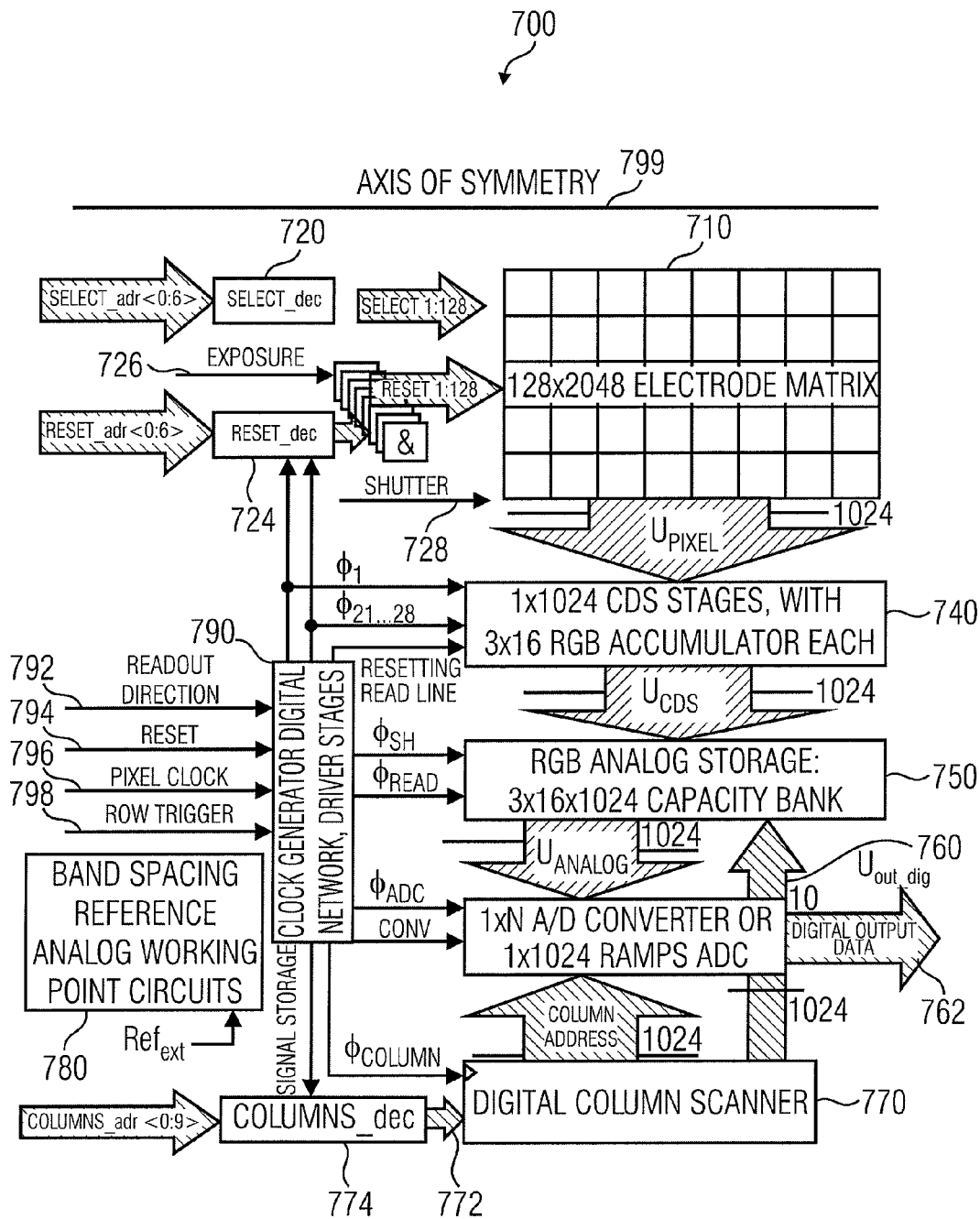
FIG. 7 is a block diagram of an architecture of a 128×2,048 TDI sensor, according to an embodiment of the present invention.

FIG. 7 shows a block circuit diagram of an image sensor according to an embodiment of the present invention. In other words, FIG. 7 exemplarily shows an architecture of a TDI image sensor used for the above-mentioned application, for a readout according to a principle of the "rolling shutter".

In its entirety, the image sensor according to FIG. 7 is designated 700. For example, the image sensor 700 includes a 128×2,048 electrode matrix 710. The electrode matrix 710 includes a matrix of image elements, or pixels, for example, such as were described with reference to FIG. 4. The image sensor 700 further includes a selection decoder 720 configured, for example, to receive seven select address signals (e.g. select address signals "select_adr<0:6>") and to activate one of 128 select signals (e.g. of select signals "select 1:128") based on this, for example. The selection decoder 720 may be configured, for example, to generate select signals for different image elements, which in FIG. 4 are designated "select" and which control the switching transistor 460 of the respective different image elements.

The image sensor 700 further includes a reset decoder 724 configured, for example, to receive seven reset address signals (e.g. reset address signals "reset_adr<0:6>") and to activate one of 128 reset signals (e.g. of reset signals "reset1:128") based on that, for example. An AND conjunction with an exposure signal 726 may be incorporated into forming the reset signals (reset1:128), as will be described in the following. The reset signals (reset1:128) may correspond to the signal "reset", for example, as is described with a view to the image element 410.

Further, the electrode matrix 710 may be optionally configured to receive a shutter signal 728.

The image sensor 700 further includes a block 740 with 1×1,024 CDS stages with 3×16 RGB accumulators each. Block 740 is coupled to the electrode matrix 710 to receive 1,024 image element voltages, or pixel voltages $U_{pixel}$ in parallel, for example. The image element voltages $U_{pixel}$ correspond to the pixel voltages $U_{pixel}$ shown in FIG. 4, for example. In other words, block 740 includes 1,024 accumulator circuits 440, as shown in FIG. 4, for example. For example, block 740 is configured to receive a control signal $\Phi_1$, additional control signals $\Phi_{21}$-$\Phi_{28}$ as well as a reset signal for a read line ("reset_read line").

The image sensor 700 further includes a block 750 of RGB analogue memories. Block 750 includes a 3×16×1024 capacity bank, for example. Thus, block 750 may correspond to the readout circuit 480 according to FIG. 4. For example, block 750 is coupled to block 740 to receive 1024 parallel output voltage signals $U_{CDS}$ from block 740. The signals $U_{CDS}$ may be the output voltages of the operational amplifier 470, for example, illustrated in FIG. 4. Block 750 is configured to receive a sample control signal (or a plurality of sample control signals) $\Phi_{SH}$ which may correspond to the sample control signals "SH<1>" to "SH<8>" shown in FIG. 4, for example. For example block 750 is further configured to receive one or plural read control signals $\Phi_{READ}$. In their function, the read control signals may correspond to the signals "read<1>" to "read<8>" shown in FIG. 4.

The image sensor 700 further includes an analogue to digital converter 760 coupled to block 750, for example, to receive 1024 parallel analogue voltages $U_{analog}$ from block 750. The analogue voltages $U_{analog}$ may correspond to the output voltage $U_{out}$ shown in FIG. 4, for example. The analogue digital converter 760 may be a 1×N analogue/digital converter according to the principle of successive approximation (SAR A/D converter) or a 1×1,024 ramp analogue/digital converter (ADC). The analogue/digital converter 760 is configured, for example, to receive an analogue/digital converter control signal, or an analogue/digital converter clock signal $\Phi_{ADC}$. Further, the analogue to digital converter 760 may be configured to receive a conversion signal "conv". The analogue to digital converter 760 is configured to provide digital output data 762, based on the analogue voltage signals $U_{analog}$.

For example, the image sensor 700 further includes a digital column scanner 770 configured to receive a column control signal $\Phi_{column}$ as well as a column information signal 772 from a column decoder 774, for example. The digital column scanner 740 is configured, for example, to provide a column address in the form of 1024 parallel signals to the analogue to digital converter 760. Further, the digital column scanner 770 is configured, for example, to provide further column select information in the form of 1024 parallel signals, for example, to block 750.

For example, the column decoder 774 is configured to receive a column address ("column_adr<0:9>") and provide the information 772 for the column scanner 770, based on the column address. The column decoder 774 is further configured to receive a signal storage signal, or a latch signal.

The image sensor 700 further includes a reference and operating point adjustment block 780 configured, for example, to receive an external reference signal Ref_ext. The reference and operating point adjustment block 780 includes, for example, a band gap reference as well as analogue working point circuits, or bias circuits.

The image sensor 700 further includes a control block 790 including a digital clock generator network as well as driver stages, for example. The digital control block 790 is configured, for example, to receive a readout direction signal 792, a reset signal 794, a pixel clock 796 and a row trigger signal 798. Further, the control block 790 is configured, for example, to generate the control signals $\Phi_1$, $\Phi_{21}$-$\Phi_{28}$ as well as the reset signal for the read line and feed them to the respective blocks, as shown in FIG. 7. Further, control block 790 is configured to generate the sample and hold control signal $\Phi_{SH}$ and the read control signal $\Phi_{read}$ and provide them to block 750. Additionally, control block 790 is configured to generate an analogue/digital converter control signal $\Phi_{ADC}$ as well as a conversion control signal "conv" and feed them to the analogue to digital converter 760. Additionally, control block 790 is configured to generate the column control signal $\Phi_{column}$ for the digital column scanner 770 and the signal-storage control signal for the column decoder 774.

It should be understood that an actual image sensor may include the circuitry 700 according to FIG. 7 twice, for example, as indicated by a symmetry axis 799. For example, a first circuit part may be responsible for processing signals from 128×1,024 image elements, and a second circuit part may be responsible for processing signals from further 128× 1,024 image elements.

In summary, it may be established that FIG. 7 shows an architecture of a 128×2,048 TDI sensor, or half of the architecture.

For example, a functionality of a synchronous shutter may be realized by modifying a row address decoder and by modifying, or supplementing, a pixel by a shutter transistor with a storage capacity. Alternatively, it is also possible to use the above-mentioned pixel principles (e.g. photogate, pinned photodiode). In these instances, the rest of the readout circuit remains the same.

For example, a random pixel access may be realized in the CMOS technique by decoder networks. The sensor, or image sensor, is here charged with a select address for rows and columns. The same is decoded and applied to the matrix. Alternatively, a shift register-based configuration may be used. Then, however, the complete image is read out before it is possible to access the pixel of interest again.

To achieve the largest possible flexibility for the TDI sensor, a decoder architecture is employed, for example, which may also operate in a simple shift mode (similar to a shift-register architecture). For a pixel-clock accurate control of the exposure time, an additional signal "exposure" may be used which is synchronized with the pixel clock, for example. For example, a signal "row trigger" determines a point in time from which a following TDI sequence is accumulated. For example, it may thus be avoided that variations in the speed of a transport conveyer belt distort the accumulated signal. For example, this signal is permanently tracked by means of a regulating device (control device) (here not shown). That is, the row trigger signal is continuously adapted to a speed with which mappings of the object move across the surface of the image sensor.

Apart from this, an identical exposure time is guaranteed for each individual accumulation sequence. A number of SAR column converters (i.e. of analogue/digital converters operating according to the method of successive approximation) or ramp converters or similar analogue/digital converters (depending on the choice) varies depending on the channel width (from single-channel to 1,024-fold column-parallel), for example. For example, adjustment of the exposure time is made in a pixel-clock accurate manner.

FIG. 8a shows a graphic illustration of signal waveforms as may occur in the image sensor 700 according to FIG. 7, for example. In its entirety, the graphic illustration according to FIG. 8a is designated 800. For example, the graphic illustration 800 describes signal waveforms for the case of an intra-row exposure. In other words, FIG. 8a shows a pixel-clock accurate adjustment of an exposure time for the case of an intra-row exposure, wherein an exposure time is smaller than a row time, or smaller than 625 ns. A first signal waveform illustration 810 describes a reset address described by the signal "reset_adr", a second signal waveform illustration 820 describes a time waveform of the select address illustrated by the signal "select_adr", and a third signal waveform illustration 830 describes a time waveform of the exposure signal 726.

FIG. 8b shows a graphic illustration of signal waveforms as may occur in the image sensor 700, for example.

In its entirety, the graphic illustration of FIG. 8b is designated 850 and describes, for example, the instance of an exposure for several row times. A first signal waveform illustration 860 describes the signal "reset_adr", a second signal waveform illustration 870 describes the signal "select_adr", and a third signal waveform illustration 880 describes the signal "exposure". Thus, for a readout of eight rows within 5 μs, maximally 5 μs of exposure time may be achieved within a TDI pipeline sequence. However, the exposure time may be arbitrarily increased. Depending on the choice, a motion advance of the object may be stopped or decelerated with exposure times larger than 5 μs, for example.

In summary, it may thus be established that a particularly advantageous adjustment of the exposure time may occur by generating the signals "select" (or "select_adr") and "reset" (or "reset_adr") independently of each other, or shifted in time by at least one step. A first time position of the "reset" signal with respect to the "select" signal is shown in FIG. 8a for an intra-row exposure, and a second relative position of the "reset" signal with respect to the "select" signal is shown in FIG. 8b for a multiple-row exposure.

In the following, it will be briefly described how a TDI CMOS sensor may be implemented for different, or any, pixel matrices. Apart from the above-described example of a CMOS TDI sensor with 128×2,048 pixels, both the choice of the pixel principle and the number of the pixels may be varied within fabrication technology restrictions. With modern manufacturing processes, it is possible, for example, to fabricate matrices with up to 4,000×8,000 pixels. A storage depth of a TDI accumulator is not limited to 8 stages either. Rather, in highly-integrated processes having metal/metal capacities or poly/polysilicon capacities, for example, storage depths up to 512 and more stages are possible. Apart from a linearly integrating pixel with or without a synchronous shutter, the following pixel principles represent possible pixel principles, for example:

1. Pinned photodiode;
2. Photogate;
3. N-well diode or P-well diode;
4. Rearside-exposed photodiode; or
5. Charge swing detectors.

In summary, it may be established that a CMOS image sensor technology offers innovative alternatives compared to CCD image sensors to capture objects exposed with a time delay. Thus, a possibility is provided to improve the measured optical signal both by circuit-related and algorithmic methods. For example, this is of great importance when capturing motion-synchronized gray-level images. With the so-called time-delayed integration methods described above, or TDI methods, an object is shifted with or against a readout direction of an image sensor matrix with the same synchronized speed. In this manner, it is possible to capture fast-moving objects almost free of distortion. Among other things, this is very important in inspections and quality controls since many objects have to be tested in the shortest time possible. In some cases, a topography measurement from an airplane or from the orbit also necessitates a motion-synchronized exposure to synchronize a motion of the capturer (e.g. an airplane or a satellite) with an exposure time which is very long due to the small detected amount of light. Further fields of applications which, apart from other things, become possible by the CMOS technique are represented by the following:

Inspection systems and positioning systems;
Automobile systems, or automotive systems, such as lane detection systems, pre-accident sensor technologies and pedestrian protection;
Topography measurements; and
All applications necessitating high sensitivity with a fast concurrent motion.

According to some embodiments of the invention, a CMOS circuit technique with switched capacitors (also referred to as CMOS SC circuit technique) is used in a TDI method. Thus, in some embodiments of the present invention, some or several of the following effects result:

1. According to the principle, the CMOS circuit technique with switched capacitors is no subject to any, or just negligible, smearing problems.
2. The CMOS circuit technique with switched capacitors admits a number of accumulation sequences which is theoretically unlimited.
3. The CMOS circuit technique with switched capacitors is significantly more cost-effective than a conventional TDI CCD technique.
4. The CMOS circuit technique with switched capacitors is suitable for high-speed applications.

In summary, it may be further established that the approach of performing an accumulation of corresponding pixels directly on the sensor chip, employed in some embodiments, has significant advantages over a partial image readout and external accumulations in a system. For example, in some embodiments, the speed requirements decrease since a full parallelity of the signal pre-processing is available on the sensor for an analogue accumulation. Thus, a time multiplex which is high with an external accumulation faces a high location multiplex with an accumulation directly on the sensor chip (also referred to as "on-chip accumulation"), by arranging signal-processing stages in columns.

Figure 9:
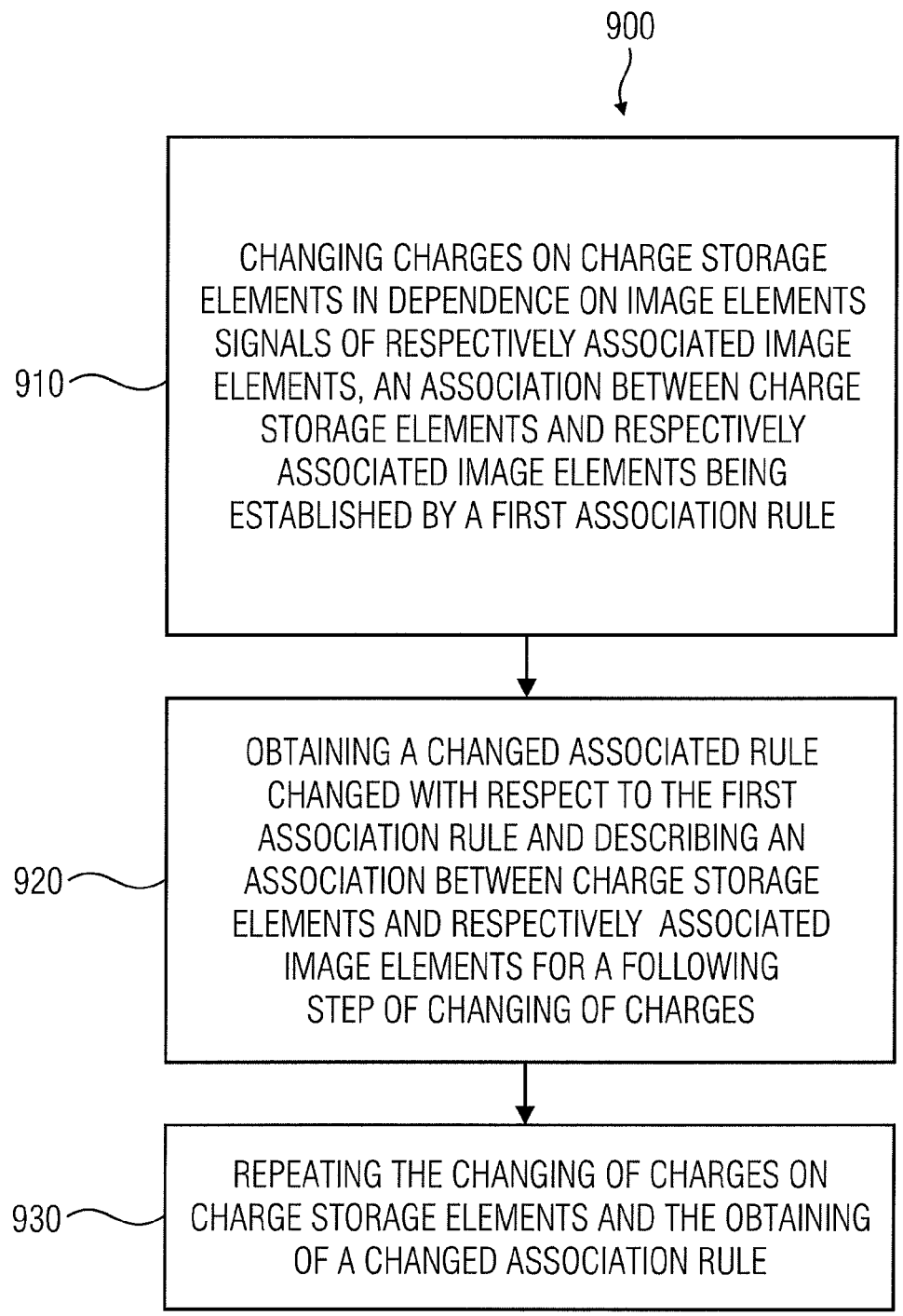
FIG. 9 is a flow diagram of a method for operating an image sensor, according to an embodiment of the present invention.

FIG. 9 shows a flow chart of a method for operating an image sensor according to an embodiment of the present invention. It is assumed that the method is employed in conjunction with an image sensor having a plurality of image elements configured to provide associated image element signals which are dependent on light intensities incident on the image elements. Further, it is assumed that the image sensor comprises a plurality of charge storage elements. In its entirety, the method according to FIG. 9 is designated 900. In a first step 910, method 900 includes changing of charges on charge storage elements in dependence on image element signals of respectively associated image elements. An association between charge storage elements and respectively associated image elements is fixed by a first association rule. In a second step 920, method 900 includes obtaining a changed association rule changed with respect to the first association rule. The changed association rule describes an association between charge storage elements and respectively associated image elements for a following step of changing of charges. In a third step 930, method 900 further includes repeating the changing of charges on charge storage elements (e.g. the first step 910) and the obtaining of a changed association rule (e.g. step 920).

For example, method 900 according to FIG. 9 may be supplemented by all those steps and features described, within the framework of the present description, also with a view to the corresponding devices.

Further, the method for operating an image sensor may also be realized by a computer program serving for controlling an image sensor, for example.

In other words, the inventive device (e.g. the device for generating control signals for the image sensor) and the inventive method (e.g. the method for operating the image sensor) may be implemented in hardware or in software. The implementation may occur on a digital storage medium, e.g. a disc, a CD, a DVD, an ROM, a PROM, an EPROM, an EEPROM or a FLASH memory with electronically readable control signals which may cooperate with a programmable computer system such that the corresponding method is executed. In general, the present invention thus also consists in a computer program with a program code stored on a machine-readable carrier for performing the inventive method, when the computer program product runs on a computer. In other words, the invention may be realized as a computer program with a program code for performing the inventive method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An image sensor, comprising:
a plurality of image elements configured to provide associated image element signals which are dependent on light intensities incident on the image elements;
an accumulation circuit comprising a plurality of charge storage elements,
wherein the accumulation circuit is configured to change charges on the charge storage elements during a phase in dependence on the image element signals of respectively associated image elements and
wherein the accumulation circuit is configured to change an association between charge storage elements and associated image elements in successive phases in such a way that a charge on one of the charge storage elements depends on image element signals of plural image elements in a plurality of phases;
wherein the image elements are coupled to a column line via respective switches,
wherein the image elements comprise a reset switch for resetting to a reset state,
wherein the accumulation circuit comprises an operational amplifier,
wherein an inverting input of the operational amplifier is electrically effectively coupled to the column line via a storage capacitor,
wherein the accumulation circuit comprises a feedback-path switch configured to couple the inverting input of the operational amplifier to the output of the operational amplifier in dependence on a feedback-path switch control signal,
wherein the accumulation circuit comprises a first switchable accumulation capacitor switchable between the inverting input of the operational amplifier and the output of the operational amplifier in dependence on a first accumulation capacitor control signal via a first accumulation capacitor switch,
wherein the accumulation circuit comprises a second switchable accumulation capacitor switchable between the inverting input of the operational amplifier and the output of the operational amplifier in dependence on a second accumulation capacitor control signal via a second accumulation capacitor switch, and
wherein the accumulation circuit comprises a third switchable accumulation capacitor switchable between the inverting input of the operational amplifier and the output of the operational amplifier in dependence on a third accumulation capacitor control signal via a third accumulation capacitor switch and
wherein a non-inverting input of the operational amplifier is coupled to a pre-given potential.

2. The image sensor according to claim 1, wherein the charge storage elements are accumulation capacitors.

3. The image sensor according to claim 1, wherein the image sensor comprises a first, second and third image element,
  wherein the first image element is configured to provide a first image element signal which is dependent on a light intensity incident on the first image element,
  wherein the second image element is configured to provide a second image element signal which is dependent on a light intensity incident on the second image element,
  wherein the third image element is configured to provide a third image element signal which is dependent on a light intensity incident on the third image element;
  wherein the accumulation circuit comprises a first accumulation capacitor and a second accumulation capacitor,
  wherein the accumulation circuit is configured to change a charge on the first accumulation capacitor in a first phase in dependence on the first image element signal and to change a charge on the second accumulation capacitor in the first phase in dependence on the second image element signal, and
  wherein the accumulation circuit is configured to change the charge on the first accumulation capacitor in a second phase in dependence on the second image element signal, and to change the charge on the second accumulation capacitor in the second phase in dependence on the third image element signal,
  wherein the accumulation circuit is configured to change the charges on the accumulation capacitors in such a way that a charge present on the first accumulation capacitor at an end of the second phase is dependent on a light intensity incident on the first image element and on a light intensity incident on the second image element and
  wherein the accumulation circuit is configured to change the charges on the accumulation capacitors in such a way that a charge present on the second accumulation capacitor at an end of the second phase is dependent on a light intensity incident on the second image element and on a light intensity incident on the third image element.

4. The image element according to claim 3, wherein the accumulation circuit is configured to change the charge on the first accumulation capacitor in a third phase in dependence on the third image element signal.

5. The image sensor according to claim 1, wherein the image elements are disposed along a column of the image sensor.

6. The image sensor according to claim 1, wherein the image elements are coupled to a column line via switches and
  wherein the accumulation circuit is configured to receive, in a phase, image element signals one after the other from a plurality of image elements via the column line, and to change charges of the charge storage elements one after the other in dependence on the current association between charge storage elements and associated image elements, in dependence on the image element signals of the respectively associated image elements.

7. The image sensor according to claim 1, wherein the accumulation circuit is configured to effect an association between a considered charge storage element and an associated image element by closing a switch to electrically effectively couple the associated image element to the column line, and by switching the charge storage element considered into the feedback path of the operational amplifier.

8. The image sensor according to claim 1, wherein an input of the operational amplifier is electrically effectively coupled to the column line via a voltage charge converter, wherein the voltage charge converter is configured to convert a change of a potential present on the column line into a charge quantity.

9. The image sensor according to claim 8, wherein the accumulation circuit is configured to feed the charge quantity generated by the voltage charge converter to one of the charge storage elements.

10. The image sensor according to claim 1, wherein the accumulation circuit is configured to change the charge of a considered charge storage element in a phase in dependence on a voltage difference between a first state of an image element signal of an image element currently associated with the charge storage element considered, and a second state of the image element signal of the image element currently associated with the charge storage element considered,
  wherein the first state of the image element signal or the second state of the image element signal is a reset state.

11. The image sensor according to claim 1, wherein the image elements are disposed along an image column of the image sensor and
  wherein the accumulation circuit is configured such that different image elements along the image column are coupled to the same charge storage elements in successive phases.

12. The image sensor according to claim 1, wherein the accumulation circuit is configured to cyclically shift the association between charge storage elements and associated image elements between two successive phases.

13. The image sensor according to claim 1, wherein the accumulation circuit is configured to close, in a first sub-step, the switch between the currently associated image element and the column line and additionally to close the feedback-path switch so that the storage capacitor is charged to an initial voltage, for changing a charge on a considered charge storage element in dependence on an image element signal of an image element currently associated with the charge storage element considered,
  to open the feedback-path switch at the end of the first sub-step,
  to close the reset switch in a second sub-step and
  to additionally switch in a third sub-step the charge storage element considered into the feedback path of the operational amplifier by closing one of the accumulation capacitor switches, so that a change of a level on the column line occurring when resetting the currently associated image element is translated into a change of the charge on the charge storage element considered.

14. The image sensor according to claim 1, wherein the accumulation circuit comprises a readout circuit configured to store and provide, for a readout, information describing a state of the charge storage elements.

15. The image sensor according to claim 14, wherein the read out circuit comprises a plurality of readout capacitors associated with respective charge storage elements,
  wherein the readout circuit is configured to transmit information about the state of a charge storage element onto a readout capacitor associated with the respective charge storage element by closing a sample switch, and to couple a readout capacitor to an output of the accumulation circuit by closing a readout switch.

16. The image sensor according to claim 1, wherein the accumulation circuit is formed as a CMOS circuit with switched capacitors.

17. The image sensor according to claim 1, wherein the image elements and the accumulation circuit are integrated on a single chip.

18. The image sensor according to claim 1, wherein the accumulation circuit is configured to change the charges on the charge storage elements by integrating a current flow.

19. The image sensor according to claim 1, wherein the image sensor comprises a control block configured to generate control signals for controlling the switches.

20. A method for operating an image sensor with a plurality of image elements configured to provide associated image element signals which are dependent on light intensities incident on the image elements, and a plurality of charge storage elements, comprising:
   a) Changing of charges on the charge storage elements in dependence on image element signals of respectively associated image elements, wherein an association between charge storage elements and respectively associated image elements is established by a first association rule;
   b) Acquiring a changed association rule changed with respect to the first association rule and describing an association between charge storage elements and respectively associated image elements for a following charge-changing step; and
   c) Repeating steps a) and b);
      wherein changing of the charges on the charge storage elements comprises
      coupling the image elements to a column line, which is coupled to an input of an operational amplifier, and
      switching a plurality of accumulation capacities, which form charge storage elements, into a feedback branch of the operational amplifier, in order to change charges of the charge storage elements, one after the other, in dependence on the current association between charge storage elements and associated image elements, and in dependence on the image element signals of the respectively associated image elements, and
      wherein the association between charge storage elements and associated image elements in successive phases is changed in such a way that a charge on one of the charge storage elements depends on image element signals of plural image elements in a plurality of phases.

21. The method according to claim 20, wherein acquiring a changed association rule comprises cyclically rotating the association.

22. The method according to claim 20, wherein control signals are generated to control the coupling of image elements to the column line and to control the switching of the accumulation capacities into the feedback branch of the operational amplifier.

23. The method according to claim 20,
   wherein the image sensor comprises a first, second and third image element,
   wherein the first image element provides a first image element signal which is dependent on a light intensity incident on the first image element,
   wherein the second image element provides a second image element signal which is dependent on a light intensity incident on the second image element,
   wherein the third image element provides a third image element signal which is dependent on a light intensity incident on the third image element;
   wherein a first accumulation capacitor servers as a first charge storage element and wherein a second accumulation capacitor serves as a second charge storage element,
   wherein a charge on the first accumulation capacitor is changed in a first phase in dependence on the first image element signal and wherein a charge on the second accumulation capacitor is changed in the first phase in dependence on the second image element signal, and
   wherein the charge on the first accumulation capacitor is changed in a second phase in dependence on the second image element signal, and wherein the charge on the second accumulation capacitor is changed in the second phase in dependence on the third image element signal,
   wherein the charges on the accumulation capacitors are changed in such a way that a charge present on the first accumulation capacitor at an end of the second phase is dependent on a light intensity incident on the first image element and on a light intensity incident on the second image element and
   wherein the charges on the accumulation capacitors are changed in such a way that a charge present on the second accumulation capacitor at an end of the second phase is dependent on a light intensity incident on the second image element and on a light intensity incident on the third image element.

24. A digital storage medium comprising a computer program for performing the method for operating an image sensor with a plurality of image elements configured to provide associated image element signals which are dependent on light intensities incident on the image elements, and a plurality of charge storage elements, the method comprising:
   a) Changing of charges on the charge storage elements in dependence on image element signals of respectively associated image elements, wherein an association between charge storage elements and respectively associated image elements is established by a first association rule;
   b) Acquiring a changed association rule changed with respect to the first association rule and describing an association between charge storage elements and respectively associated image elements for a following charge-changing step; and
   c) Repeating steps a) and b),
   when the computer program runs on a computer;
   wherein changing of the charges on the charge storage elements comprises
   coupling the image elements to a column line, which is coupled to an input of an operational amplifier, and
   switching a plurality of accumulation capacities, which form charge storage elements, into a feedback branch of the operational amplifier, in order to change charges of the charge storage elements, one after the other, in dependence on the current association between charge storage elements and associated image elements, and in dependence on the image element signals of the respectively associated image elements, and
   wherein the association between charge storage elements and associated image elements in successive phases is changed in such a way that a charge on one of the charge storage elements depends on image element signals of plural image elements in a plurality of phases.

25. An image sensor, comprising:
   a plurality of image elements configured to provide associated image element signals which are dependent on light intensities incident on the image elements;
   an accumulation circuit comprising a plurality of charge storage elements,
   wherein the accumulation circuit is configured to change charges on the charge storage elements during a phase in dependence on the image element signals of respectively associated image elements and wherein the accumulation circuit is configured to change an association between charge storage elements and associated image elements in successive phases in such a way that a charge on one of the charge storage elements depends on image element signals of plural image elements in a plurality of phases;

wherein the image elements are coupled to a column line via switches;

wherein the accumulation circuit is configured to receive, in a phase, image element signals one after the other from a plurality of image elements via the column line, and to change charges of the charge storage elements one after the other in dependence on the current association between charge storage elements and associated image elements, in dependence on the image element signals of the respectively associated image elements;

wherein the accumulation circuit comprises an operational amplifier;

wherein an input of the operational amplifier is coupled to the column line; and wherein a feedback branch of the operational amplifier comprises a plurality of switched accumulation capacities switchable into the feedback branch via switches and forming the charge storage elements.

26. The image sensor according to claim 25, wherein the image sensor comprises a control block configured to generate control signals for controlling the switches.

27. An image sensor, comprising:

a plurality of image elements configured to provide associated image element signals which are dependent on light intensities incident on the image elements;

an accumulation circuit with a plurality of charge storage elements, wherein the accumulation circuit is configured to change charges on the charge storage elements during a phase in dependence on the image element signals of respectively associated image elements and wherein the accumulation circuit is configured to change an association between charge storage elements and associated image elements in successive phases in such a way that a charge on one of the charge storage elements depends on image element signals of plural image elements in a plurality of phases;

wherein the image elements are coupled to a column line via switches, wherein the accumulation circuit comprises an operational amplifier;

wherein an input of the operational amplifier is electrically effectively coupled to the column line via a voltage/charge converter;

wherein the voltage/charge converter is configured to convert a change of a potential present on the column line into a charge quantity;

wherein the accumulation circuit is configured to change, in a phase, the charge of a considered charge storage element switched into a feedback path of the operational amplifier, in dependence on a voltage difference between a first state of an image element signal of an image element currently associated with the charge storage element considered, and a second state of the image element signal of the image element currently associated with the charge storage element considered, wherein the first state of the image element signal or the second state of the image element signal is a reset state.

28. An image sensor, comprising:

a plurality of image elements configured to provide associated image element signals which are dependent on light intensities incident on the image elements;

an accumulation circuit comprising a plurality of charge storage elements, wherein the accumulation circuit is configured to change charges on the charge storage elements during a phase in dependence on the image element signals of respectively associated image elements and wherein the accumulation circuit is configured to change an association between charge storage elements and associated image elements in successive phases in such a way that a charge on one of the charge storage elements depends on image element signals of plural image elements in a plurality of phases;

wherein the image sensor comprises a first, second and third image element, wherein the first image element is configured to provide a first image element signal which is dependent on a light intensity incident on the first image element, wherein the second image element is configured to provide a second image element signal which is dependent on a light intensity incident on the second image element, wherein the third image element is configured to provide a third image element signal which is dependent on a light intensity incident on the third image element;

wherein the accumulation circuit comprises a first accumulation capacitor and a second accumulation capacitor, wherein the accumulation circuit is configured to change a charge on the first accumulation capacitor in a first phase in dependence on the first image element signal and to change a charge on the second accumulation capacitor in the first phase in dependence on the second image element signal, and wherein the accumulation circuit is configured to change the charge on the first accumulation capacitor in a second phase in dependence on the second image element signal, and to change the charge on the second accumulation capacitor in the second phase in dependence on the third image element signal, wherein the accumulation circuit is configured to change the charge on the first accumulation capacitor in such a way that a charge present on the first accumulation capacitor at an end of the second phase is dependent on a light intensity incident on the first image element and on a light intensity incident on the second image element and wherein the accumulation circuit is configured to change the charge on the second accumulation capacitor in such a way that a charge present on the second accumulation capacitor at an end of the second phase is dependent on a light intensity incident on the second image element and on a light intensity incident on the third image element;

wherein the accumulation circuit is configured to change the charge on the first accumulation capacitor in a third phase in dependence on the third image element signal.

* * * * *